(12) United States Patent
Tani et al.

(10) Patent No.: US 6,616,523 B1
(45) Date of Patent: Sep. 9, 2003

(54) VEHICLE AIR CONDITIONER AND CEILING STRUCTURE FOR AIR-CONDITIONED VEHICLE

(75) Inventors: Toshihiko Tani, Wako (JP); Yasuyuki Koma, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/714,274

(22) Filed: Nov. 17, 2000

(30) Foreign Application Priority Data

Nov. 19, 1999 (JP) .......................................... 11-330630
Nov. 22, 1999 (JP) .......................................... 11-331333
Nov. 24, 1999 (JP) .......................................... 11-332684

(51) Int. Cl.$^7$ ................................................ B60H 1/26
(52) U.S. Cl. ........................ 454/137; 454/154; 454/316
(58) Field of Search ................................ 454/136, 137, 454/154, 155, 158, 202, 316, 319, 320; 362/149; 296/208, 214

(56) References Cited

U.S. PATENT DOCUMENTS

| | | | | |
|---|---|---|---|---|
| 2,472,748 A | * | 6/1949 | Labus .......................... | 454/316 |
| 3,522,839 A | * | 8/1970 | Wendt et al. ................. | 165/44 |
| 3,935,803 A | * | 2/1976 | Bush ........................... | 454/189 |
| 4,807,523 A | * | 2/1989 | Radtke et al. ............... | 454/137 |
| 5,501,634 A | | 3/1996 | Wilder | |
| 5,575,715 A | | 11/1996 | Norbury, Jr. et al. | |
| 5,918,972 A | * | 7/1999 | Van Belle .................... | 362/149 |
| 5,971,847 A | * | 10/1999 | Webb .......................... | 454/290 |
| 6,120,090 A | * | 9/2000 | Van Ert et al. ............. | 280/751 |
| 6,176,775 B1 | * | 1/2001 | Volk ............................. | 454/154 |
| 6,318,102 B1 | * | 11/2001 | Asou et al. .................. | 454/137 |

FOREIGN PATENT DOCUMENTS

| | | |
|---|---|---|
| DE | 36 19 077 A1 | 12/1986 |
| DE | 297 06 751 U1 | 7/1997 |
| DE | 297 19 024 U1 | 1/1998 |

* cited by examiner

Primary Examiner—Harold Joyce
(74) Attorney, Agent, or Firm—Arent Fox Kintner Plotkin & Kahn

(57) ABSTRACT

Air-accumulating chamber of a roof air duct has a non-branched configuration and is located substantially centrally in a widthwise direction of a vehicle. Air emission port sections emit conditioned air from the air-accumulating chamber toward respective rear seats. In each of the air emission port sections, a sawtooth-like surface is formed on each port base member and a resilient locking protrusion is provided on a grill for meshing engagement with the sawtooth-like surface. Air emission port, air-conditioner operating section and room lamp are provided together as a unit on the port base member.

5 Claims, 18 Drawing Sheets

(PRESENT INVENTION)

VEHICLE AIR CONDITIONER AND CEILING STRUCTURE FOR AIR-CONDITIONED VEHICLE

BACKGROUND OF THE INVENTION

1. Field of the Invention

The present invention relates to an improved vehicle air conditioner which can be manufactured at low costs and which provides for uniform blowoff or emission of conditioned air through air emission ports onto respective rear seats in a passenger compartment of the automotive vehicle.

The present invention also relates to an improved vehicle air conditioner which can reliably maintain a desired direction of conditioned air emission through air emission ports.

The present invention also relates to an improved ceiling structure for an air-conditioned automotive vehicle which can be mounted on a ceiling base member with enhanced ease and affords enhanced convenience of use or operability and which can be manufactured at low costs.

2. Description of the Related Art

Vehicle air conditioners have been known which include an roof air duct provided on the vehicle ceiling for emitting conditioned air toward rear seats of the automotive vehicle.

FIG. 17 hereof is an exploded perspective view showing a conventionally-known roof air duct employed in a vehicle air conditioner. The roof air duct 100 comprises a roof lining or ceiling base member 101 fixed inwardly of a roof panel (not shown), and a duct panel 102 attached to the roof lining 101 in face-to-face relation. The duct panel 102 has an air inlet portion 103 for introducing air into the roof air duct 100, and extended air passageways 111, 112, 113 and 114 for delivering conditioned air to air emission ports 104, 105, 106 and 107, respectively, formed in predetermined positions of the roof lining 101. Namely, the conventional roof air duct 100 is formed into a fork-like branched configuration to deliver the conditioned air via the several separate air passageways 111, 112, 113 and 114; the branched configuration of the roof air duct 100 provides a branched air-accumulating chamber in the air duct 100.

Because one extended air passageway 111, 112, 113, 114 is provided for each of the emission ports 104, 105, 106 and 107 on a one-to-one correspondence, the duct panel 102 would be very complicated in overall shape, and thus fabricating a mold for forming such a duct panel 102 would require a number of processes and hence high costs. Further, a greater volume of the air, introduced into the duct 100 through the air inlet portion 103, tends to be directed to the extended air passageway 114 located close to an extension line or main airflow route of the inlet portion 103 while a much smaller volume of the introduced air tends to be directed to the extended air passageway 111 greatly deviated from the extension line or main airflow route of the inlet portion 103 (see FIG. 13A). Thus, the known roof air duct 100 presents the inconvenience that a significant difference would occur in the volume of the air emitted through the individual emission ports 104, 105, 106 and 107.

Further, an air emission port section for a vehicle air conditioner, through which conditioned air is emitted to a passenger compartment, is known, for example, from Japanese Utility Model Laid-open Publication No. HEI-3-11654. The air emission port section disclosed in this publication includes a grille holder having an inner sliding surface of a spherical shape, and an angle-adjustable grille mounted rotatably in the grille holder and having a profile corresponding to the spherical sliding surface of the holder.

In the disclosed air emission port section, however, there would be produced a greater gap between the inner sliding surface of the grille holder and the outer surface of the angle-adjustable grille if the inner diameter of the holder defined by the spherical sliding surface is greater than a center value of its predetermined dimensional tolerance range while the outer diameter of the grille is smaller than a center value of its predetermined dimensional tolerance range, in which case the grille 10 would rotate more easily relative to the holder's sliding surface. Thus, the grille 10 having been properly adjusted in its rotational position in the grill holder would accidentally rattle or rotate in the holder due to vibration, shape or the like of the automotive vehicle. The rattle or rotation of the grille may prevent the air emission through the air emission port section from being held in a desired direction; that is, a desired air emitting direction may not be obtained or maintained.

Further, to the ceiling base member, such as the roof lining, of automotive vehicles, there are generally attached a plurality of the above-mentioned air emission port sections of the air conditioner, air-conditioner operating section for adjusting the temperature and volume of the conditioned air emitted through the emission port sections, loop lamps and many other ceiling components. The vehicle ceiling having these ceiling components provided thereon will be hereinafter called a "ceiling structure". FIG. 18 is a bottom view of a conventionally-known ceiling structure for an air-conditioned vehicle as viewed from within a passenger compartment of an automotive vehicle 112. A plurality of ceiling-component mounting panels 101 are provided on a ceiling base member 100 in corresponding relation to passenger seats (i.e., one ceiling-component mounting panel 101 per passenger seats), with each of the ceiling-component mounting panels 101 provided with an air emission port 102, 103, 104 or 105 of the vehicle air conditioner and room lamp 106, 107, 108 or 109. Further, an air-conditioner operating section 111 is attached to an end portion of the ceiling base member 100.

When the temperature and/or volume of the conditioned air emitted through the air emission port 102 is to be adjusted in the automotive vehicle 112 of FIG. 18, the passenger on the seat closest to or associated with the air emission port 102 can easily reach and manipulate the air-conditioner operating section 111 for the desired adjustment. However, if the conditioned air emitted through any one of the other air emission ports 103–105 is to be adjusted, the passenger on the seat associated with the air emission port 103–105 can not easily reach and manipulate the air-conditioner operating section 111 due to a long distance from the operating section 111.

Although it is possible to position the air-conditioner operating section 111 at a substantial center of the ceiling base member 100 close to the individual air emission ports 102 to 105, this approach presents the inconvenience that the operating section 111 would give a rather offensive sight and thus considerably damage the overall appearance of the vehicle ceiling. Further, because the above-mentioned ceiling-component mounting panels 101 are separate and apart from each other, it is necessary for a human operator to move a lot in attaching the mounting panels 101 to the ceiling base member 100, which would result in a poor assembly or mounting efficiency. Furthermore, attaching the separate ceiling-component mounting panels 101 to the ceiling base member 100 requires provision of a number of mounting holes, parts and the like, which would lead to increased manufacturing costs.

SUMMARY OF THE INVENTION

It is accordingly a first object of the present invention to provide a vehicle air conditioner which can be manufactured at low costs and which provides for uniform emission of conditioned air through air emission ports into the interior of the vehicle.

It is a second object of the present invention to provide a vehicle air conditioner which includes an air emission port section capable of maintaining a desired air emitting direction.

It is a third object of the present invention to provide a ceiling structure for an air-conditioned vehicle which can be mounted with an enhanced efficiency and affords enhanced convenience of use or operability and which can be manufactured at low costs.

In order to accomplish the above-mentioned first object, the present invention provides a vehicle air conditioner which comprises an air duct provided on a ceiling of a vehicle and having an air inlet portion for introducing air into the air duct and an air-accumulating chamber communicating at an upstream end thereof with the air inlet portion. The air-accumulating chamber has a non-branched configuration and is located substantially centrally in a widthwise direction of the vehicle. The air-accumulating chamber extends in a longitudinal direction of the vehicle from a rear end portion to a near-center portion of the ceiling. The vehicle air conditioner further comprises: air emission port sections provided on the underside of the air duct and communicating with the air-accumulating chamber for emitting the air from the air-accumulating chamber toward respective rear seats of the vehicle; and an air distribution member, preferably in a plate shape, for variably distributing the air to be delivered from the air inlet portion, through the air-accumulating chamber, to the air emission port sections. Preferably, the air-accumulating chamber is generally in a rectangular shape as viewed in plan. Conditioned air introduced via the air inlet portion is distributed by the air distribution member and temporarily accumulated in the non-branched air-accumulating chamber extending in the longitudinal direction of the vehicle, before it is emitted through the air emission port sections toward the rear seats (e.g., second-row and third-row seats).

In the present invention arranged in the above-mentioned manner, the air duct can be significantly simplified in shape as compared to the conventional counterpart, and the mold for forming the air duct can be fabricated at less costs, so that the overall manufacturing costs of the air duct can be reduced effectively. Further, by the provision of the non-branched air-accumulating chamber in the air duct, the air duct can deliver, to the individual air emission port sections, the conditioned air having temporarily accumulated in the air-accumulating chamber in the air duct to assume a substantially uniform pressure distribution, and thus the conditioned air can be emitted through the air emission port sections in generally uniform volumes, in contrast to the conventional air duct having a fork-like branched air-accumulating chamber with one extended air passageway per air emission port. The respective volumes of the conditioned air emitted through the emission ports toward the individual seats can be set or varied freely by changing at least one of the orientation, position and size of the air distribution member and/or the number of the air distribution member used.

In order to accomplish the above-mentioned second object, the present invention provides a vehicle air conditioner which comprises: a grille having a plurality of parallel air slits and rotatably mounted in an air emission port formed in a port base member in such a manner that a direction of air emitted through the air slits of the grille can be adjusted by rotating the grille either rightward or leftward in the air emission port; a sawtooth-like surface formed on and along one of an outer circumferential surface of the grille and an inner circumferential surface of the port base member defining the air emission port; and a locking protrusion provided, on the other of the outer circumferential surface of the grille and the inner circumferential surface of the port base member, for meshing engagement with the sawtooth-like surface in such a manner that the grille can be rotated over a desired angle to a desired rotational position and held at the desired rotational position in the air emission port.

With stepwise meshing engagement (preferably, resilient meshing engagement) of the locking protrusion with the sawtooth-like surface, the grille can be rotated over a desired angle to a desired rotational position and hence to a desired air emitting direction and then held at the desired rotational position in the air emission port. As a consequence, any desired direction of the conditioned air emission can be reliably obtained and such a desired air emitting direction can be retained as desired without being adversely influenced by vibration, shake or the like of the vehicle.

Further, in order to accomplish the above-mentioned third object, the present invention provides a ceiling structure for an air-conditioned vehicle, which comprises: a ceiling base member; a port base member mounted substantially centrally on the ceiling base member and functioning as a multi-purpose ceiling-component panel having formed therein a plurality of air emission ports for a vehicle air conditioner; an air-conditioner operating section for adjusting temperature and/or volume of the air emitted through the air emission ports; and a room lamp for illuminating a passenger compartment, the air emission ports, air-conditioner operating section and room lamp being provided together as a unit on the port base member.

With the inventive ceiling structure, the air emission ports, air-conditioner operating section and room lamp are located near each individual seat in a passenger compartment, so that every one of the passengers on these seats can easily reach and manipulate any desired one of the ceiling components provided on the base member. Thus, the present invention can enhance the convenience of use or operability of the air emission ports, air-conditioner operating section and room lamp. Further, the collective provision of the air emission ports, air-conditioner operating section and room lamp at the substantial central portion of the ceiling base member eliminates the need for a human operator to move a great amount in mounting these ceiling components, thereby greatly enhancing the assembly or mounting efficiency.

Furthermore, with the above-mentioned inventive arrangement that the air emission ports, air-conditioner operating section and room lamp are provided together as a unit on the port base member or multi-purpose ceiling-component mounting panel, the number of necessary parts can be significantly reduced, as compared to the case where these ceiling components are mounted separately.

It is desirable that the ceiling structure further comprises a plurality of grilles, mounted in respective ones of the air emission ports, for fixing a flow direction of air emitted from the pots.

BRIEF DESCRIPTION OF THE DRAWINGS

Certain preferred embodiments of the present invention will be described in greater detail below, by way of example only, with reference to the accompanying sheets of drawings, in which.

DETAILED DESCRIPTION OF THE PREFERRED EMBODIMENTS

The following description is merely exemplary in nature and in no way intended to limit the invention, its application or uses.

Figure 1:
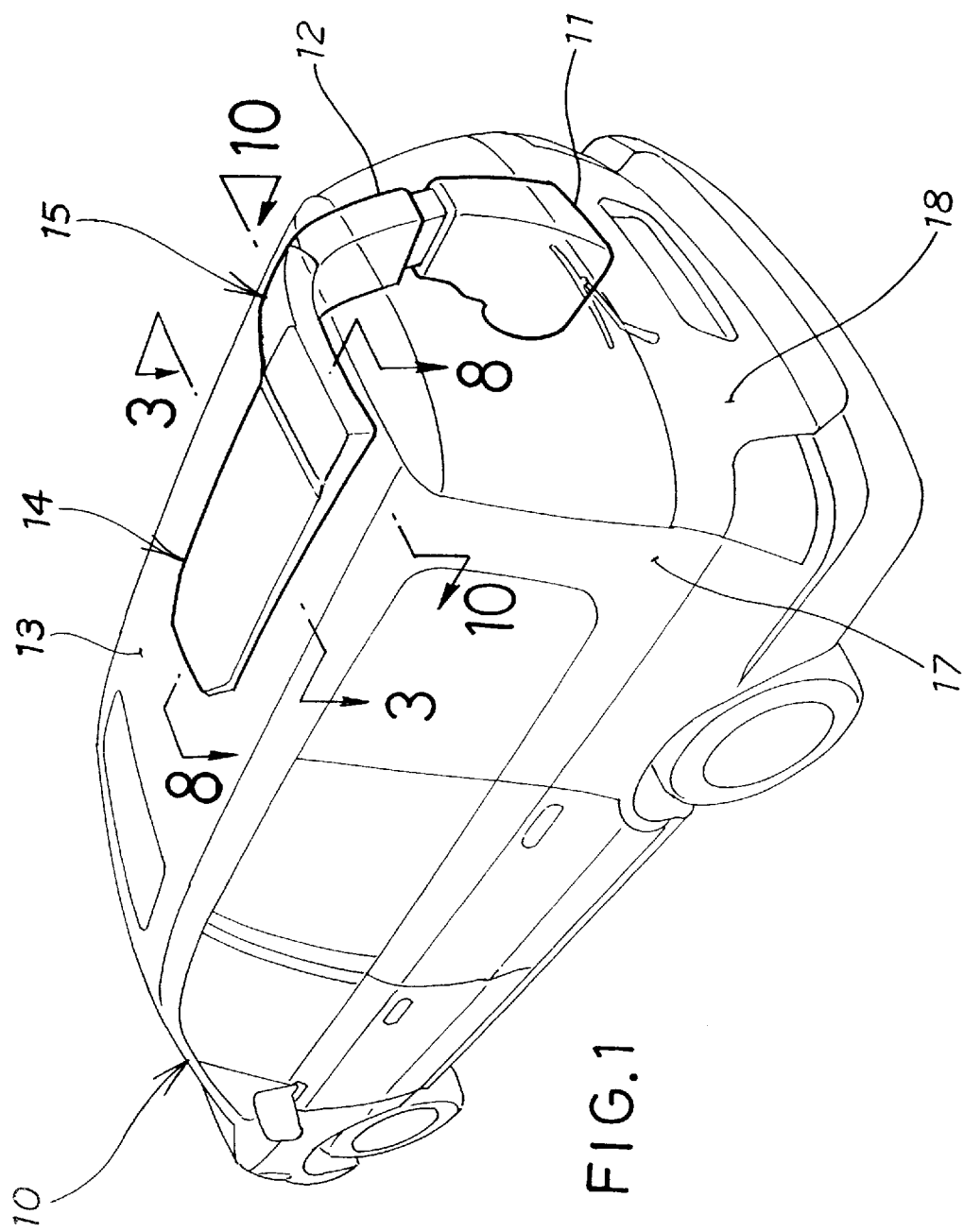
FIG. 1 is an overall perspective view of an automotive vehicle on which is mounted an air conditioner in accordance with an embodiment of the present invention.

FIG. 1 is an overall perspective view of an automotive vehicle on which is mounted a vehicle air conditioner in accordance with an embodiment of the present invention. The vehicle air conditioner 15 is intended to condition air for rear-seat passengers and includes an air-conditioning unit 11 provided inwardly of a right-rear side panel (not shown) of the vehicle 10, and the air-conditioning unit 11 includes a heater unit, a cooler unit and a blower motor as known in the art. The vehicle air conditioner 15 also includes a roof air duct 14 that is provided under a roof panel 13 and connected via a side air duct 12 to the air-conditioning unit 11. Reference numerals 17 and 18 in FIG. 1 represent a left-rear side panel and back door of the vehicle 10, respectively.

Figure 2:
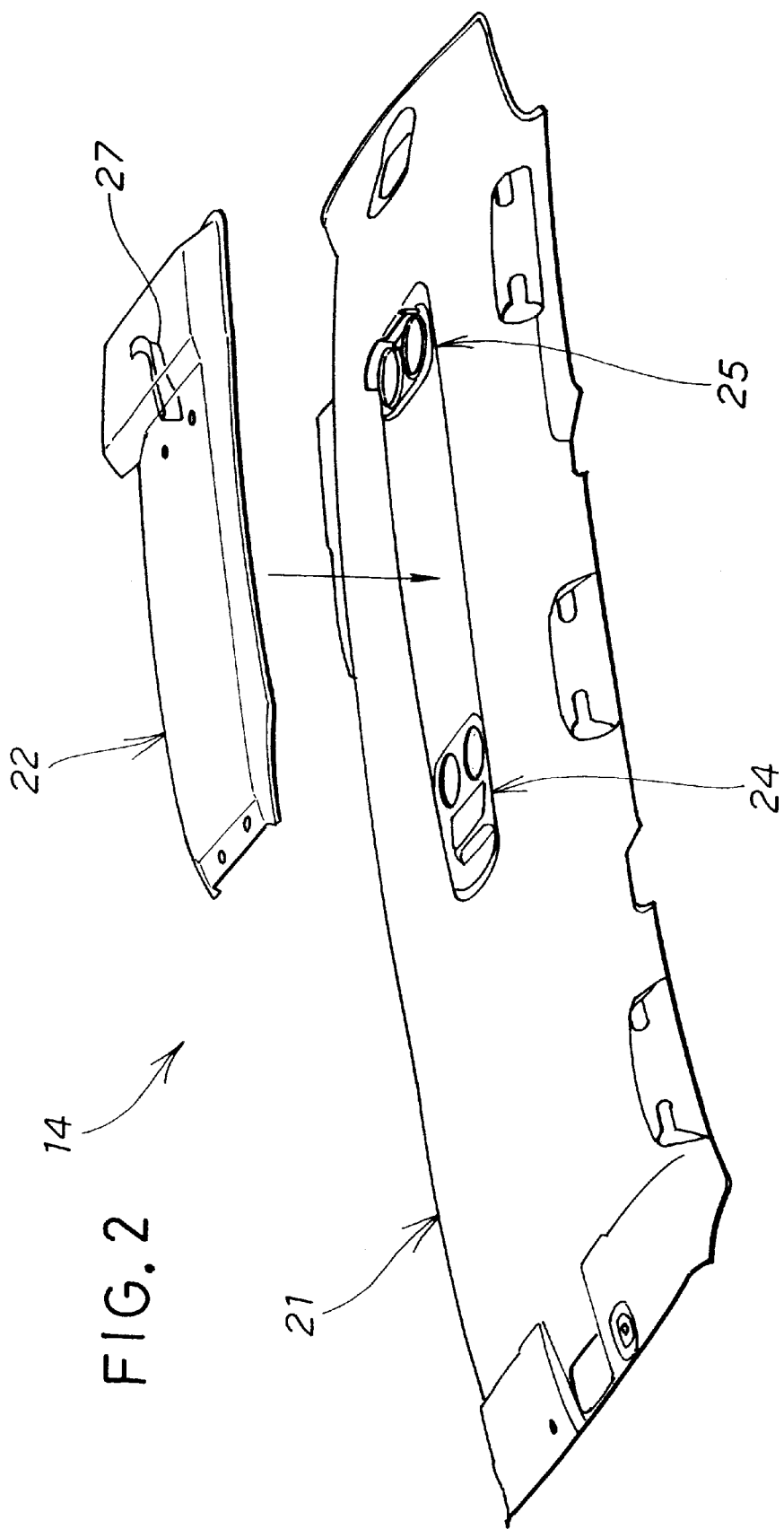
FIG. 2 is an exploded perspective view of a roof air duct employed in the present invention.

FIG. 2 is an exploded perspective view of the roof air duct 14 in accordance with a preferred embodiment of the present invention, which includes a roof lining 21 as a ceiling base member fixed inwardly of the roof panel 13 (FIG. 1), and a duct panel 22 made of resin and attached to the upper surface of the roof lining 21 in face-to-face relation. The roof lining 21, functioning as a ceiling base member, has a fore air emission port section 24 and a rear air emission port section 25 formed substantially centrally in the widthwise direction of the vehicle 10. These fore air emission port section 24 and rear air emission port section 25 serve to emit, toward the respective rear seats (e.g., second-row and third-row seats), air of a temperature and volume conditioned by the air-conditioning unit 11 of FIG. 1.

Figure 3:
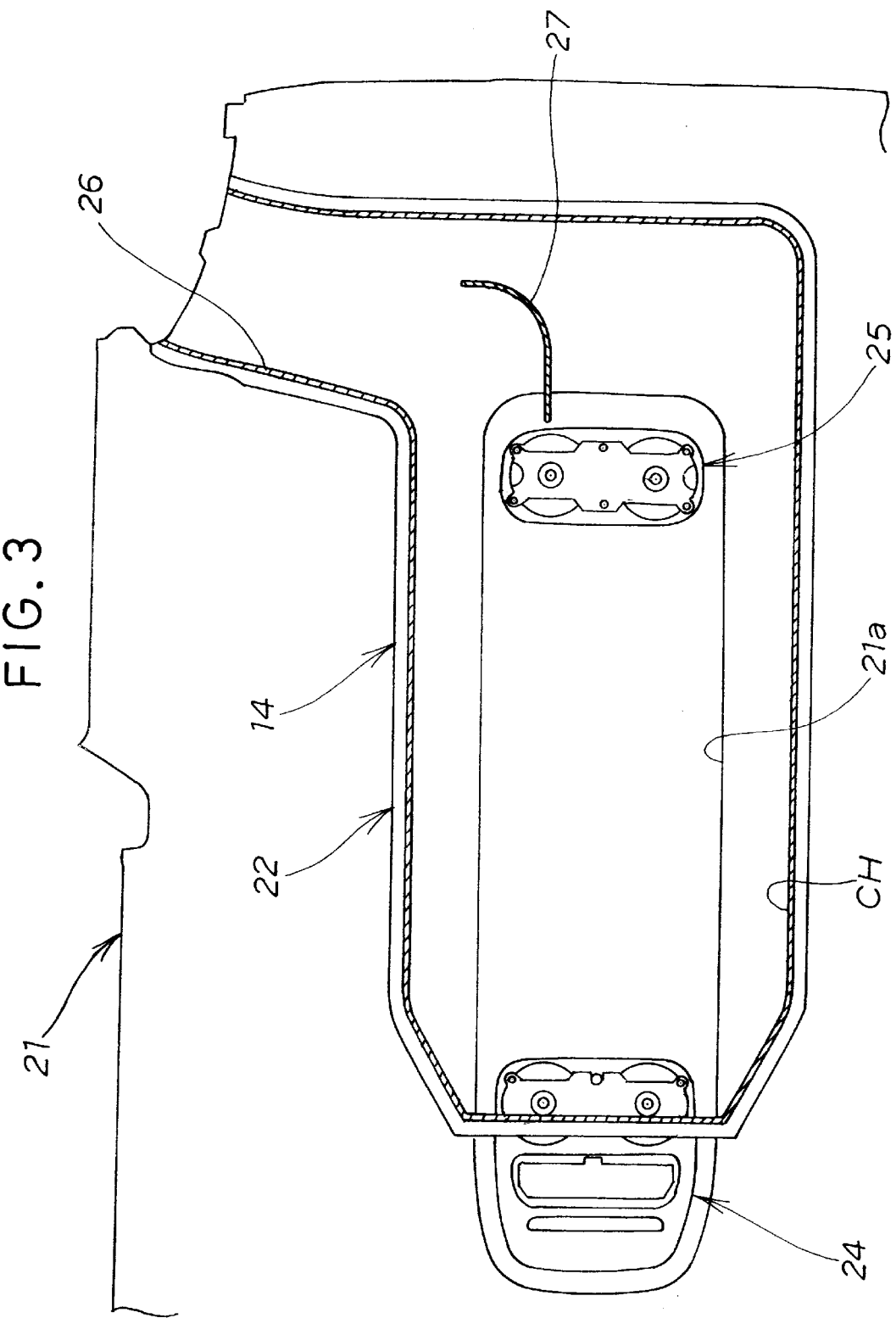
FIG. 3 is a sectional view taken along the line 3—3 of FIG. 1.

FIG. 3 is a sectional view taken along the line 3—3 of FIG. 1, and more particularly shows a cross section of the duct panel 22. The duct panel 22 is generally in an L shape as viewed in plan. In the roof air duct 14 of the invention, the duct panel 22 and roof lining 21 together define an air-accumulating chamber CH located substantially centrally in the widthwise direction of the vehicle 10 and having a non-branched configuration—preferably, a rectangular shape as viewed in plan. The non-branched air-accumulating chamber CH extends in the longitudinal, i.e. front-and-back, direction of the vehicle 10 from a rear end portion up to a near-center portion of the vehicle ceiling, and has, at its rear or upstream end, an air inlet portion 26 extending rightward toward the right-rear side panel to connect to the side air duct 12 of FIG. 1 in air communication therewith. The roof air duct 14 of the invention also includes an air distribution member 27, preferably in the form of an air distribution plate, that is secured to the inner surface of the duct panel 22 and serves to distribute the conditioned air to be delivered toward the fore and rear air emission port sections 24 and 25 provided on the roof lining 21. Reference numeral 21a represents a depressed portion of the roof lining 21.

Figure 4:
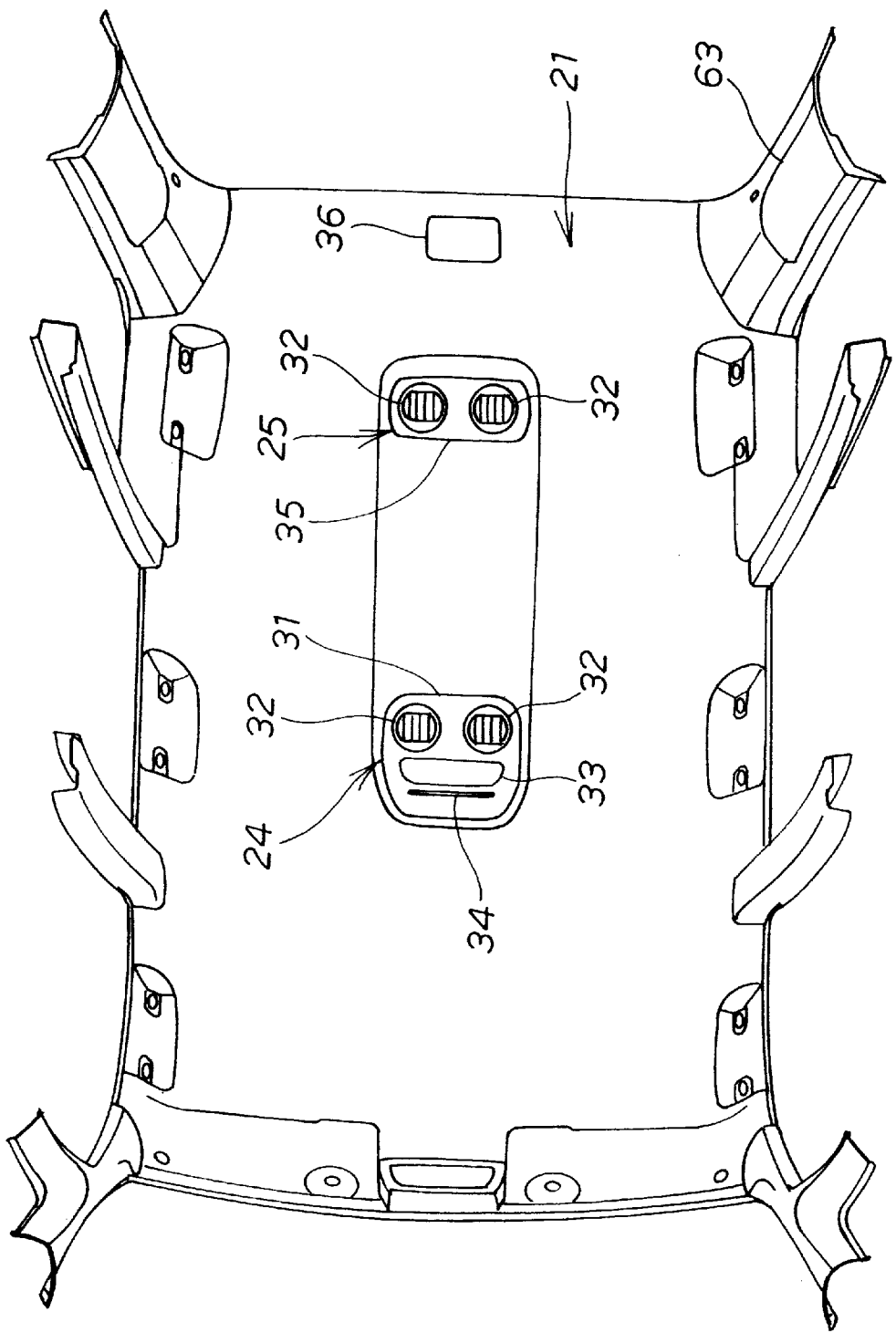
FIG. 4 is a bottom view of a vehicle ceiling having mounted thereon the vehicle air conditioner of the present invention.

FIG. 4 is a bottom view of the vehicle ceiling to which is attached the vehicle air conditioner of the present invention. The fore air emission port section 24 provided on the roof lining 21 includes a fore port base member 31 functioning as a multi-purpose ceiling-component mounting panel, a pair of air-emitting-direction adjustment operators or grilles 32, a center room lamp 33 for illuminating the passenger compartment, and an air-conditioner operating section 34 for use by a passenger to manually adjust the temperature and volume of the conditioned air. The rear air emission port section 25 provided on the roof lining 21 includes a rear port base member 35, a pair of air-emitting-direction adjustment operators or grilles 32 and a rear room lamp 36. Note that the air-emitting-direction adjustment operators or grilles 32 in the fore air emission port section 24 and in the rear air emission port section 25 are constructed in the same manner and hence represented by the same reference numeral.

Figure 5:
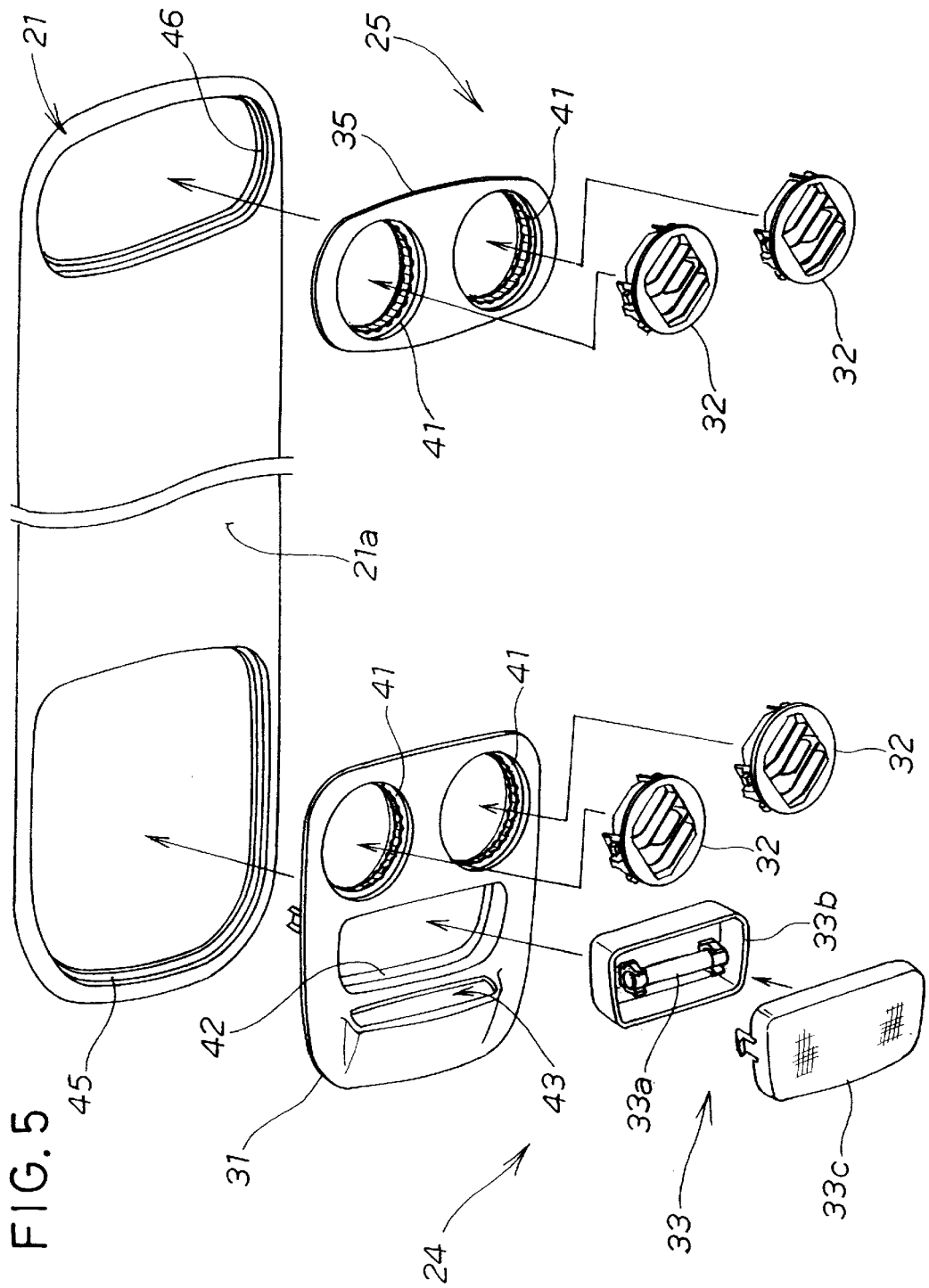
FIG. 5 is an exploded perspective view showing fore and rear air emission port sections of the vehicle air conditioner of the present invention.

FIG. 5 is an exploded perspective view showing the fore and rear air emission port sections 24 and 25. As shown, in the fore port base member 31 of the fore air emission port section 24, there are formed two holes 41 for rotatably mounting therein the respective air-emitting-direction adjustment operators 32, a hole 42 for mounting therein the center room lamp 33, and a hole 43 for mounting therein the air-conditioner operating section 34. In the rear port base member 35 of the rear air emission port section 25, there are formed two holes 41 for rotatably mounting therein the respective air-emitting-direction adjustment operators 32, hole 42 for mounting therein the center room lamp 33, hole 43 for mounting therein the air-conditioner operating section 34. In the present invention, the direction-adjustment-operator mounting holes 41 each functions also as an air emission port, as will be later described in detail. Further, in the depressed portion 21a (which slightly projects into the passenger compartment) of the roof lining 21, there are formed an opening 45 for mounting therein the fore air emission port section 24, and an opening 46 for mounting therein the rear air emission port section 25. The center room lamp 33 includes a bulb 33a held by a bulb holder 33b, and a lens 33c.

Namely, in the instant embodiment, the fore port base member 31, air-emitting-direction adjustment operators 32 and mounting holes 41 together constitute the fore air emission port section 24, while the rear port base member 35, air-emitting-direction adjustment operators 32 and mounting holes 41 therefor together constitute the rear air emission port section 25.

Figure 6:
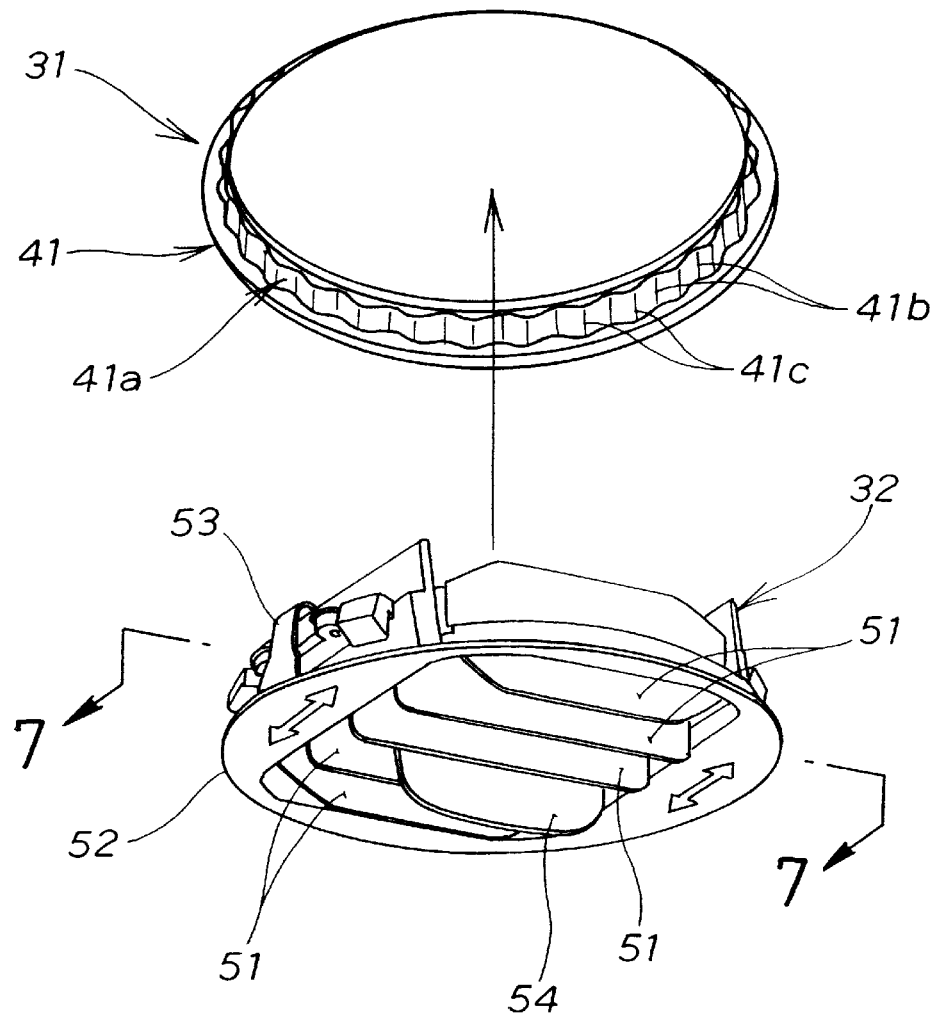
FIG. 6 is an exploded view showing an air-emitting-direction adjustment operator and a port base member having a hole for rotatably mounting therein the adjustment operator.

FIG. 6 is an exploded view showing the air-emitting-direction adjustment operator 32 and the port base member 31 having the mounting hole 41 for the adjustment operator 32. Each of the air-emitting-direction adjustment operator 32 is in the form of a grating or angle-adjustable grille having a plurality of parallel fins 51 each pivotably held by a fin holder or grille holder 52 and a leaf spring 53 attached, as a resilient locking protrusion, to the outer circumferential surface of the fin holder 52. Parallel air slits or elongate air gaps are formed between the fins 51 for volume- and direction-controlled emission or blowoff of the conditioned air via the non-branched air-accumulating chamber CH. One of the fins 51 has an integral knob portion 54 so that pressing the knob portion 54 in any one of arrowed directions can cause all the fins 51 to pivot together in the one direction. Inner circumferential surface 41a of the port base member 31 defining the hole 41 for mounting the air-emitting-direction adjustment operator or grille 32 of the fore air emission port section 24 is formed into a substantial sawtooth shape having a series of alternating projected and recessed portions (mountain and valley portions) 41b and 41c. Although not specifically shown, the rear port base member 35 of the rear air emission port section 25 also has an inner circumferential surface formed into a substantial sawtooth shape having a succession of alternating projected and recessed portions (mountain and valley portions). In addition, the air-emitting-direction adjustment operator or grille 32 on the rear port base member 35 has parallel fins and air slits and a leaf spring similar to those of the above-described air-emitting-direction adjustment operator or grille 32 on the fore port base member 31.

Figure 7:
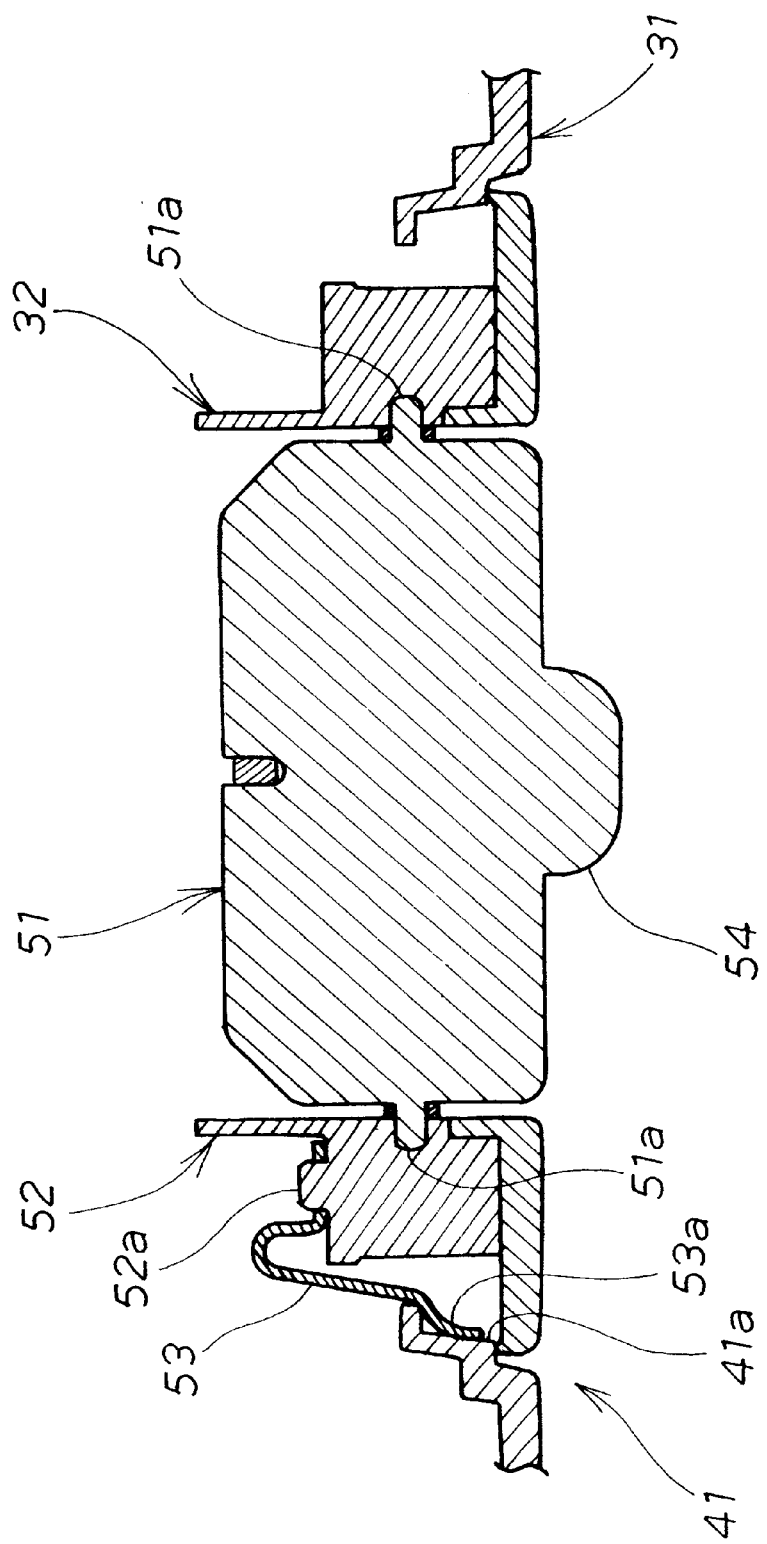
FIG. 7 is a sectional view taken along the line 7—7 of FIG. 6.

FIG. 7 is a sectional view taken along the line 7—7 of FIG. 6. Each of the fins 51 has small horizontal projections 51a at its horizontal opposite ends fitting into opposed wall portions of the fin holder 52 for vertical pivotal movement of the fin 51 relative to the fin holder 52. The fin holder 52 has an upward protrusion 52a on a portion of its upper surface corresponding in position to the leaf spring 53 so that an inner end portion of the leaf spring 53 is fitted in and thus engaged with the upward protrusion 52a while the outer or distal end 53a of the leaf spring 53 is resiliently pressed against the inner circumferential surface 41a of the port base member 31 defining the mounting hole 41. With the outer or distal end 53a of the leaf spring 53 thus resiliently pressed against the inner circumferential surface 41a having the alternating projected and recessed portions, the air-emitting-direction adjustment operator 32 can be rotated compulsorily relative to the inner circumferential surface 41a of the port base member 31 defining the mounting hole 41, but can also be reliably prevented from accidental rotation relative to the inner circumferential surface 41a due to vibration, shake or the like of the vehicle. It should be appreciated that each of the air-emitting-direction adjustment operator 32 rotatably mounted in the mounting holes 41 of the rear air emission port section 25 is constructed and operates in a similar manner to the adjustment operator 32 of the fore air emission port section 24 described above in relation to FIGS. 6 and 7, although not specifically shown.

Figure 8:
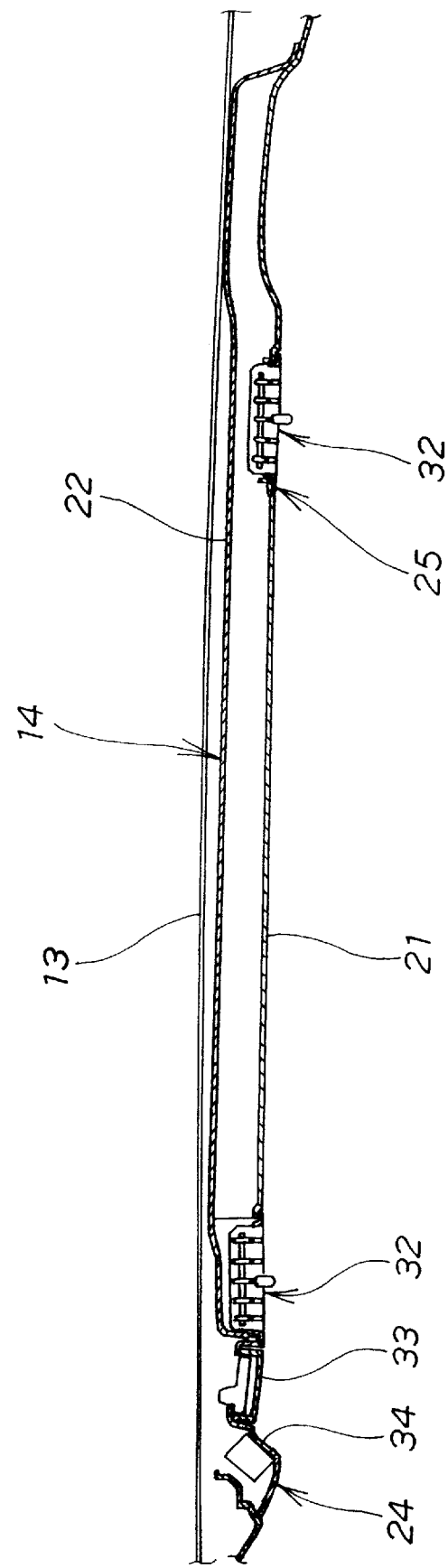
FIG. 8 is a sectional view taken along the line 8—8 of FIG. 1.

FIG. 8 is a sectional view taken along the line 8—8 of FIG. 1, which particularly shows the roof air duct 14 having a flat low-profile configuration interposed between the roof panel 13 and the roof lining 14 with the longitudinal direction of the roof air duct 14 coinciding with the front-and-back direction of the vehicle. Because of the flat low-profile configuration of the roof air duct 14, the roof lining 14 can be positioned at a higher level and it is possible to significantly increase the effective interior space of the passenger compartment without increasing the height of the vehicle.

Figure 9:
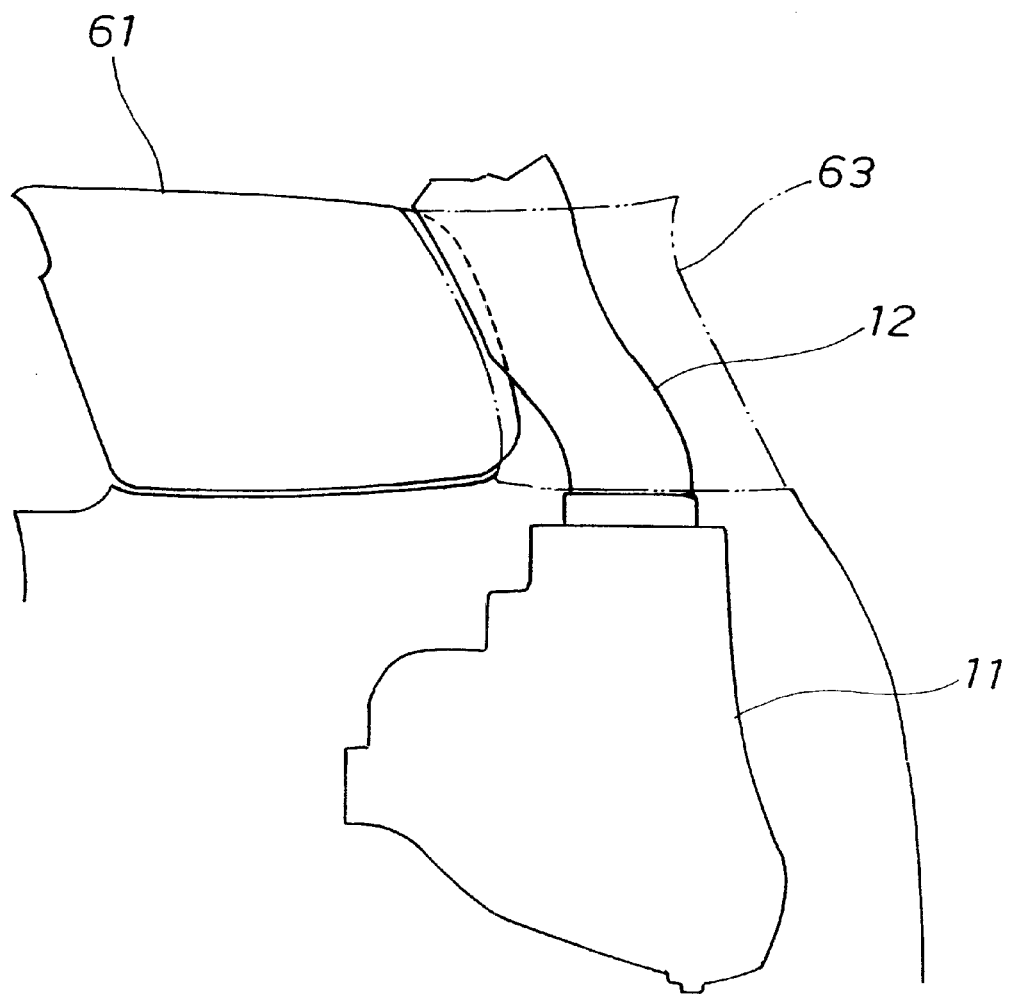
FIG. 9 is a side view showing an air conditioning unit and side air duct of FIG. 1.

FIG. 9 is a side view showing the air conditioning unit 11 and side air duct 12 employed in the vehicle air conditioner of the present invention. As shown, the side air duct 12 connected with the air conditioning unit 11 is disposed laterally inward of a rear pillar located behind a quarter window glass 61, and the side air duct 12 and rear pillar are covered with a rear garnish 63.

Figure 10:
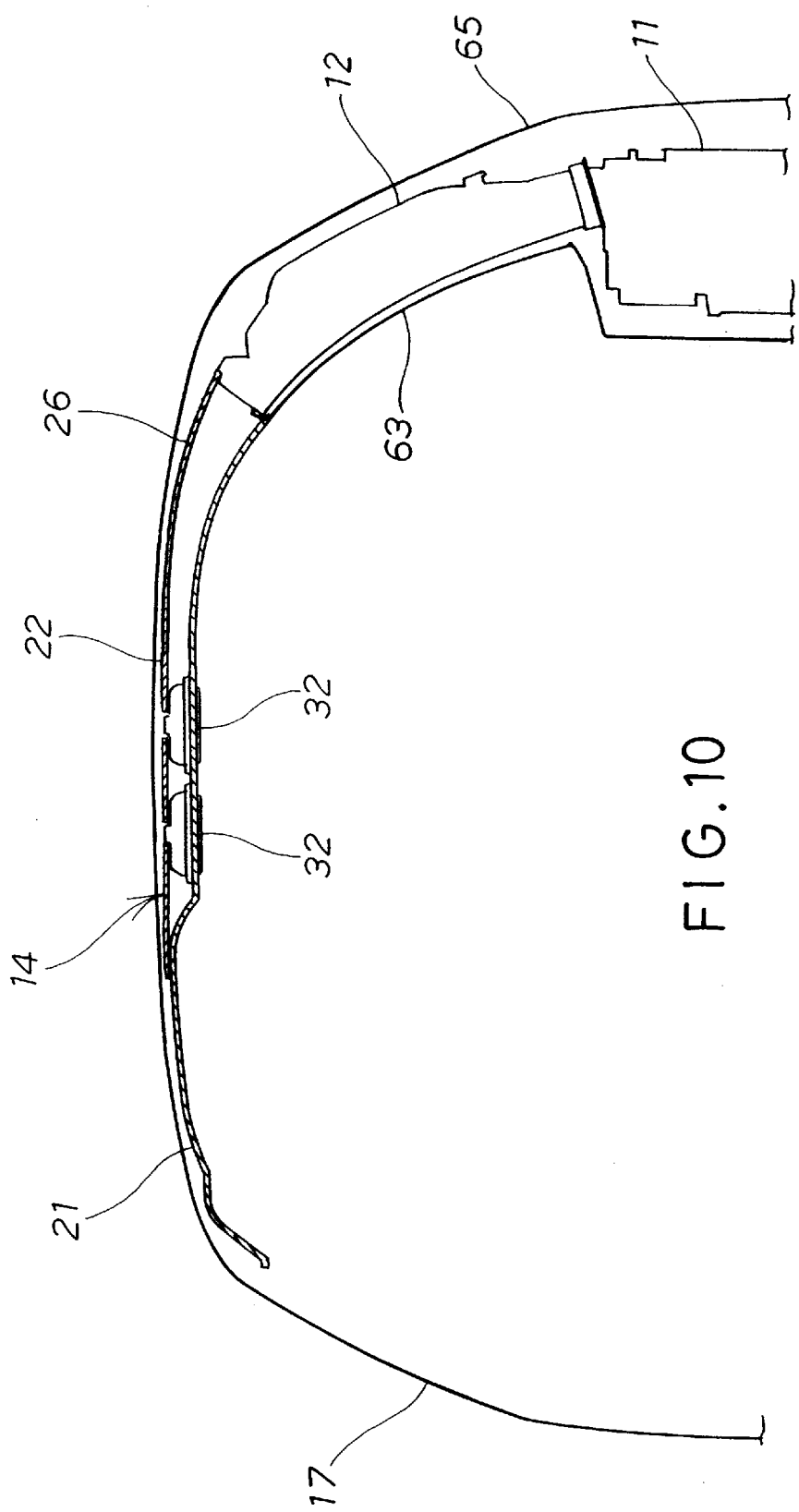
FIG. 10 is a sectional view taken along the line 10—10 of FIG. 1.

FIG. 10 is a sectional view taken along the line 10—10 of FIG. 1, from which it is seen that the air inlet portion 26 of the roof air duct 14 is connected via the side air duct 12 to the air conditioning unit 11.

Figure 11:
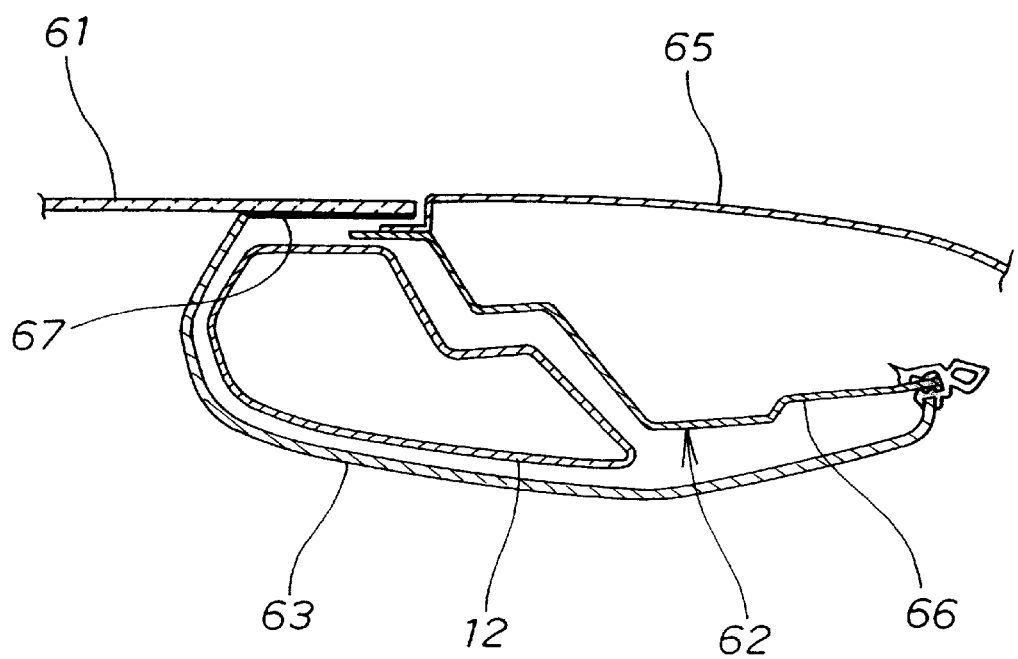
FIG. 11 is a cross-sectional view showing the air conditioning unit and side air duct of FIG. 1.

FIG. 11 is a cross-sectional view of the side air duct 12 employed in the vehicle air conditioner of the present invention. As shown, the side air duct 12 is disposed laterally inward of the quarter window glass 61 and rear pillar 62 located rearwardly of the glass 61, and the rear garnish 63 is provided laterally inward of the side air duct 12 to cover the side air duct 12. In FIG. 11, reference numeral 65 represents a right-rear side panel, 66 an inner panel, and 67 a black filter or painted-in-black portion provided on the inner surface of the quarter window glass 61 to make the window glass 66 opaque.

Exemplary manner in which the vehicle air conditioner of the present invention delivers the conditioned air, through the roof air duct and air emission port sections, into the passenger compartment is now explained as follows, with reference to FIG. 12. Once a passenger P1 seated on one of the second-row seats manipulates the air-conditioner operating section 34 to turn on the blower motor, the conditioned air is introduced from the air conditioning unit 11 and delivered into the roof air duct 14 via the side air duct 12. A proportion of the conditioned air is emitted through the fore air emission port section 24 toward the passenger P1 on the second-row seat as arrowed, and another proportion of the conditioned air is emitted through the rear air emission port section 25 toward another passenger P2 on the third-row seat as arrowed. The rear-seat passengers P1 and P2 can easily adjust the emitted or blown-off direction of the conditioned air, as desired, by means of the respective overhead air-emitting-direction adjustment operators 32. Further, the vehicle driver or passenger on the assistant driver's seat can also adjust the emitted direction of the conditioned air by means of a rear-seat air-emitting-direction adjustment operator (not shown) provided on an instrument panel 69.

Figure 13A:
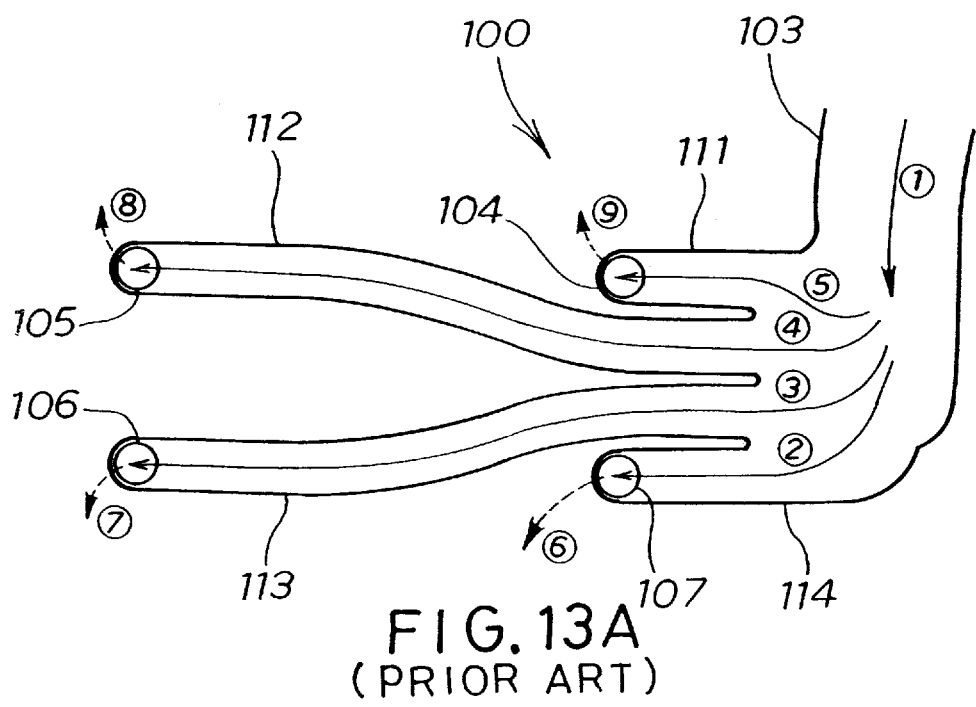
FIGS. 13A and 13B are views explanatory of a difference in behavior between a conventional roof air duct and the roof air duct of the present invention.
Figure 13B:
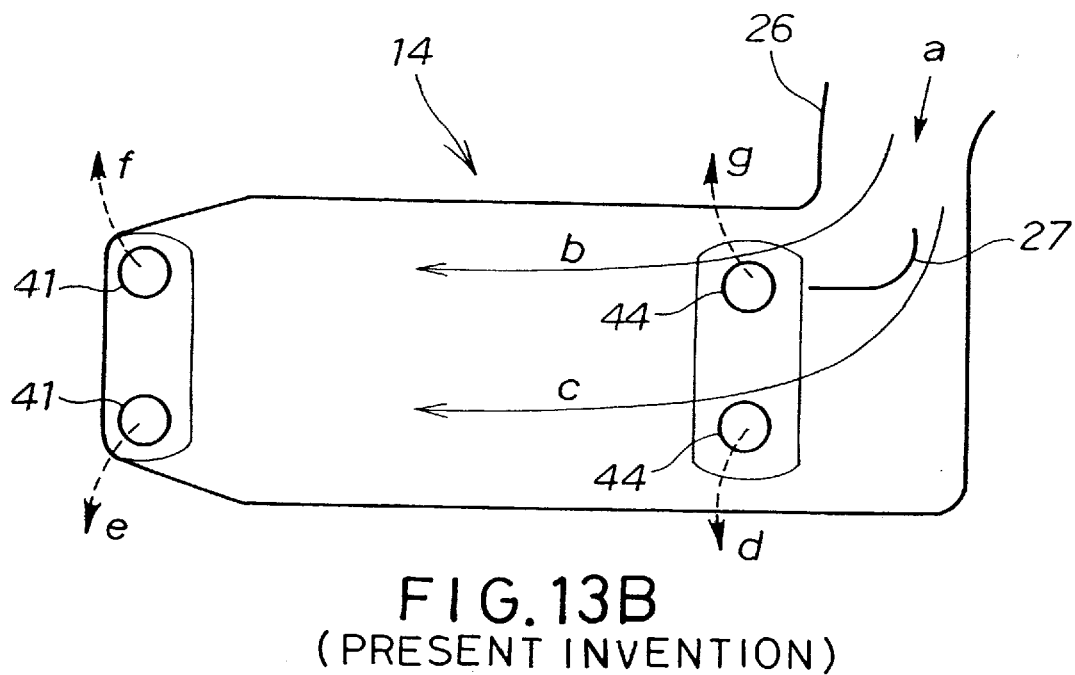
Figure 17:
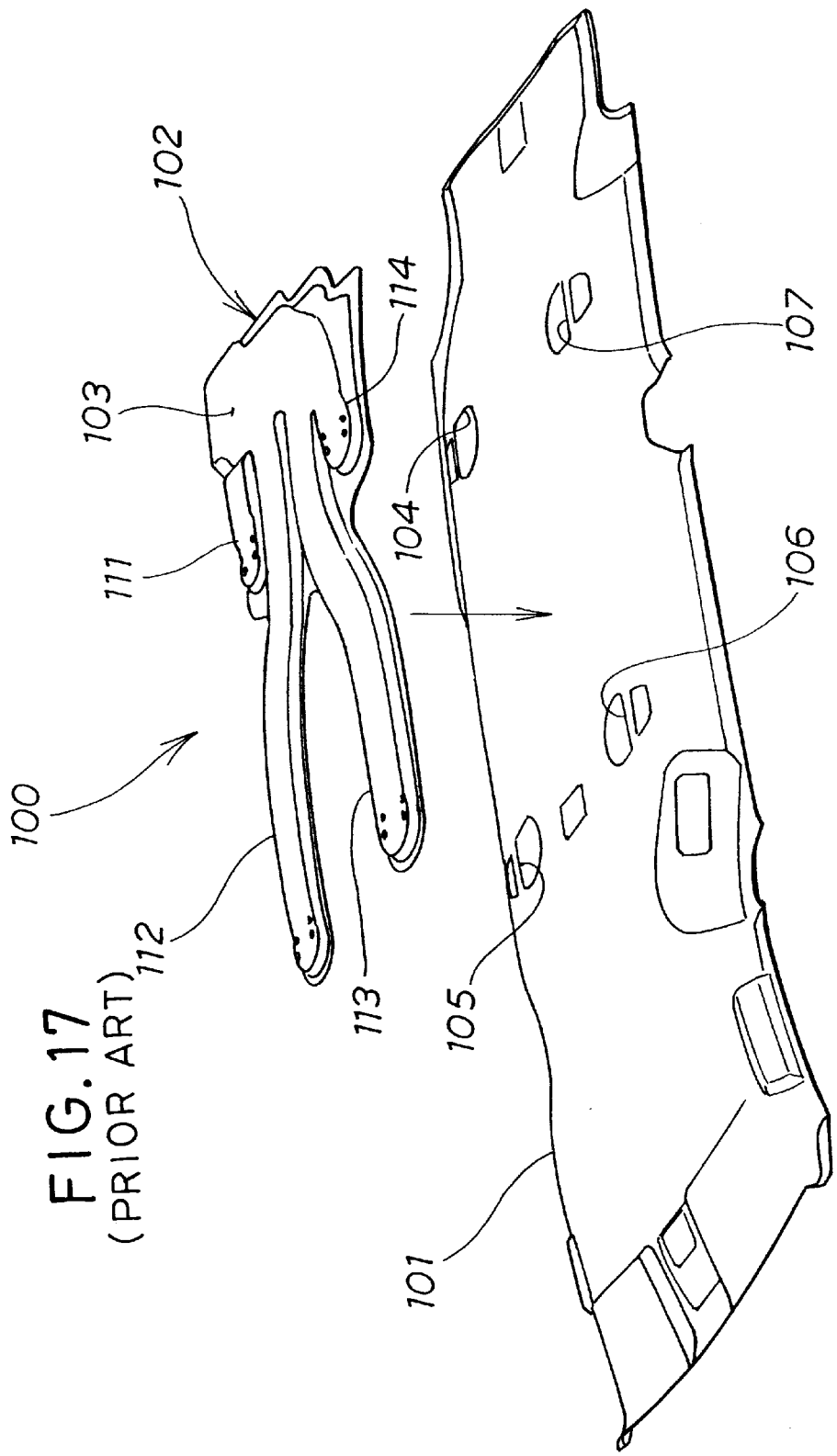
FIG. 17 is an exploded perspective view showing the conventional roof air duct of FIG. 13A.
Figure 18:
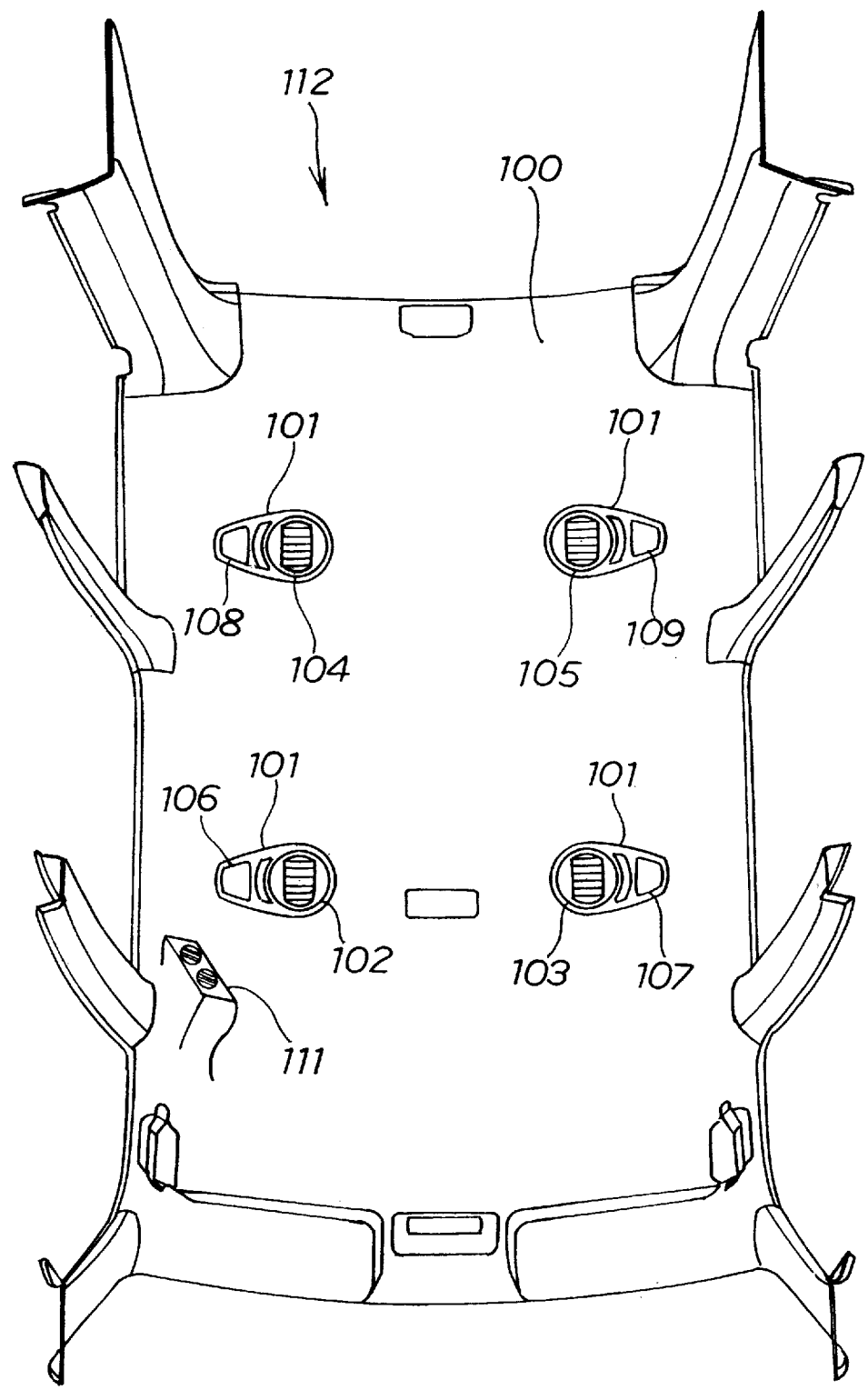
FIG. 18 is a bottom view of a conventionally-known ceiling structure as viewed from within a passenger compartment.

The following paragraphs describe the behavior of the roof air duct 14 of the invention in contradistinction to the conventional roof air duct 100 shown in FIG. 17, with reference to FIGS. 13A and 13B. In the conventional roof air duct of FIG. 13A, the air supplied from the air conditioning unit to the air inlet portion 103 as denoted by arrow ① is directed to the extended air passageway 114, located close to the direction of the extension line or main airflow route of the inlet portion 103 as denoted by arrow ②, in a much greater volume than directed to the extended air passageway 111 greatly deviated from the main airflow route of the inlet portion 103 as denoted by arrow ⑤. Although the extended air passageway 113 is relatively close to the main airflow route (arrow ①) of the inlet portion 103, it tends to impart a greater resistance to the flowing conditioned air due to its great length and thereby considerably restricts the volume of the conditioned air flowing therethrough (arrow ③). The remaining extended air passageway 112 is also greatly deviated from the main airflow route of the inlet portion 103 and has a great length, so that the volume of the conditioned air flowing through the air passageway 112 (arrow ④) is also considerably restricted. Thus, in this conventional roof air duct 100 constructed into a branched configuration, the conditioned air is emitted through the air emission port 107 (arrow ⑥) in a greater volume than emitted through the other air emission ports 106, 105 and 104 (denoted by arrows ⑦, ⑧ and ⑨, respectively), thereby resulting in a nonuniform conditioned-air distribution within the vehicle compartment.

By contrast, in the roof air duct of the invention shown in FIG. 13B, the air supplied to the air inlet portion 26 as denoted by arrow a is directed along the opposite sides of the air distribution member 27 to flow forward as denoted by arrows b and c so that it is accumulated in the common air-accumulating chamber CH of the roof air duct 14 to assume a substantially uniform pressure distribution. After such temporarily accumulation in the air-accumulating chamber CH, the conditioned air can be emitted, in substantially uniform volumes, through the direction-adjustment-operator mounting holes 41, functioning as air emission ports, of the fore and rear air emission port sections 24 and 25, as denoted by arrows e, f, d and g.

Further, by the provision of the air distribution member 27 within the roof air duct 14, the instant embodiment allows the conditioned air to flow into the wide interior space of the duct 14 without involving an uneven distribution of the air, which will also greatly contribute to uniform emission of the conditioned air through the direction-adjustment-operator mounting holes 41 of the fore and rear air emission port sections 24 and 25. Furthermore, the respective volumes of the conditioned air emitted, through the direction-adjustment-operator mounting holes 41, toward the individual seats can be set or varied freely by changing at least one of the orientation, position and size of the air distribution member 27 and/or the number of the distribution member 27 used.

As set forth above, the vehicle air conditioner of the present invention is characterized in that the roof air duct 14 provided on the ceiling of the vehicle 10 has the air-accumulating chamber CH having a non-branched configuration,—preferably, a rectangular shape as viewed in plan—and located substantially centrally in the widthwise direction of the vehicle 10 and the non-branched air-accumulating chamber CH extends in the longitudinal direction of the vehicle from a rear end portion to a near-center portion of the ceiling. Further, the direction-adjustment-operator mounting holes 41 are provided below the roof air duct 14 so as to function as the air emission ports communicating with the air-accumulating chamber CH for emitting the conditioned air from the air-accumulating chamber CH toward the respective rear seats of the vehicle. Furthermore, the roof air duct 14 has incorporated therein the air distribution member 27 for variably distributing the air to be delivered from the air inlet portion, through the air-accumulating chamber CH, to the air emission ports.

Thus, in the present invention, the roof air duct 14 can be greatly simplified in shape as compared to the conventional counterpart, and the mold for forming the roof air duct 14, specifically the molds for forming the duct panel 22 and roof lining 21 constituting the roof air duct 14, can be fabricated at less costs, so that the manufacturing costs of the roof air duct 14 can be reduced effectively.

Further, by the provision of the non-branched air-accumulating chamber CH in the roof air duct 14, the roof air duct 14 of the invention can deliver, to the direction-adjustment-operator mounting holes 41, the conditioned air having temporarily accumulated in the air-accumulating chamber CH in the roof air duct 14 to assume a substantially uniform pressure distribution, and thus the conditioned air can be emitted through the direction-adjustment-operator mounting holes 41 in generally uniform volumes, in contrast to the conventional air duct having one extended air passageway per air emission port.

Whereas the preceding paragraphs have described the air distribution member 27 as provided on the duct panel 22, the present invention is not so limited; for example, the air distribution member 27 may be provided on the roof lining 21. Further, although the roof air duct 14 has been described above as including, as the fore and rear air emission port sections, the two fore direction-adjustment-operator mounting holes 41 and two rear direction-adjustment-operator mounting holes 41, these mounting holes 41 may be provided in any other positions of the air duct 14 than the above-mentioned, in which case too the respective volumes of the conditioned air emitted through the holes 41 can be made substantially uniform for the same reasons as mentioned above. Furthermore, the number of the direction-adjustment-operator mounting holes 41 may be other than the above-mentioned.

Figure 14A:
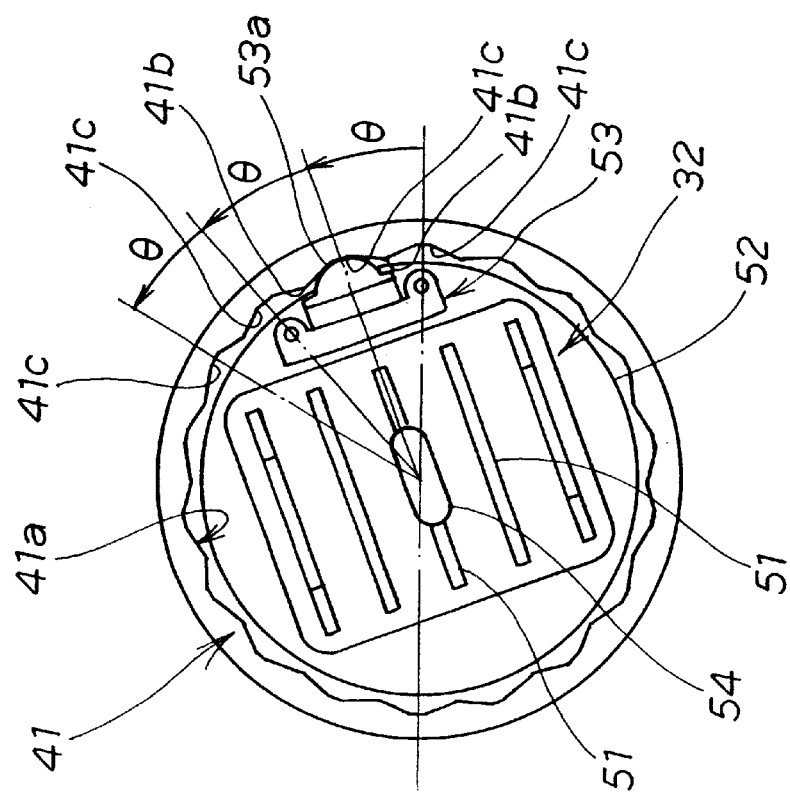
FIGS. 14A and 14B are views explanatory of construction and operation of an air-emitting-direction adjustment operator or grille and a hole for mounting therein the air-emitting-direction adjustment operator employed in the present inventions.
Figure 14B:
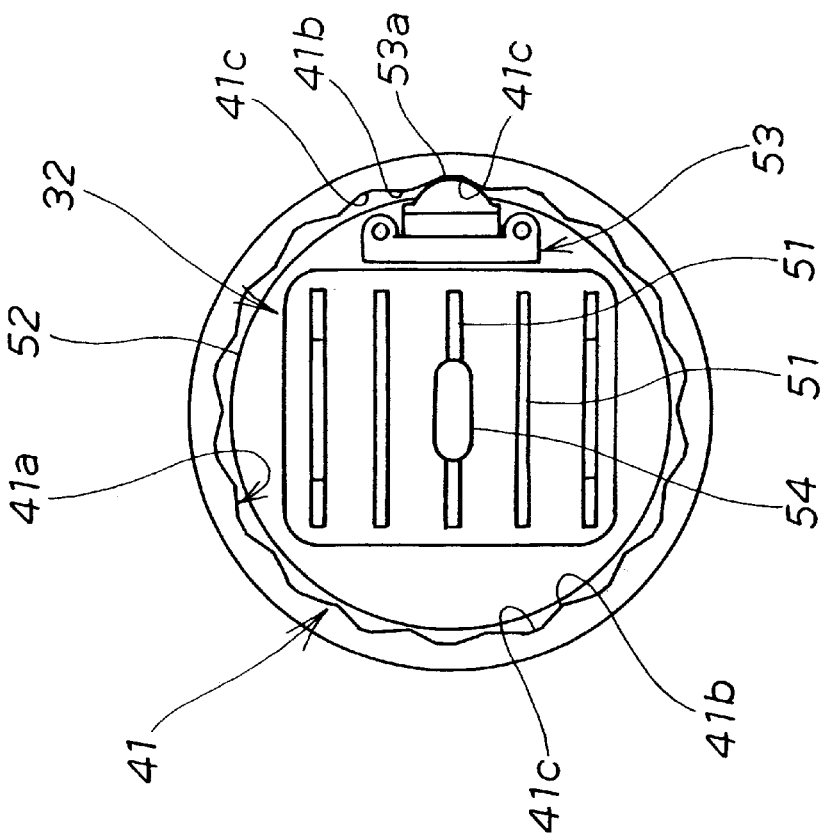

The following paragraphs describe detailed construction and operation of the above-mentioned air-emitting-direction adjustment operator or grille 32 and the hole 41 for mounting the air-emitting-direction adjustment operator 32 which are provided in each of the fore and rear air emission port sections 24 and 25, with reference to FIGS. 14A and 14B. FIG. 14A shows the air-emitting-direction adjustment operator 32 before desired adjustment of the air emitting direction takes place. In this state, the leaf spring 53 attached, as a resilient locking protrusion, to the fin holder 52 is kept in meshing engagement with one of the recessed or valley portions 41c (i.e., between adjoining projected portions 41b) formed in the inner circumferential surface 41a defining the mounting hole 41 by being resiliently pressed at its outer or distal end 53a against the one recessed portion 41c.

To adjust the air emitting direction, the air-emitting-direction adjustment operator 32 is manually rotated to a desired orientation, e.g. over a minimum adjustment angle θ in the counterclockwise direction in the figure, by pinching the knob portion 54 or any other suitable portion of the adjustment operator 32, as illustrated in FIG. 14B. At that time, the distal end 53a of the leaf spring 53 moves from the one recessed portion 41c, over the top of the adjoining projected portion 41b, to the next recessed portion 41c for resilient meshing engagement therewith. Namely, in the illustrated example, the minimum adjustment angle θ, is set to equal an angle defined by an imaginary center of the mounting hole 41 and the bottoms of every adjoining recessed portions 41c. As the air-emitting-direction adjustment operator 32 is further rotated, the distal end 53a of the leaf spring 53 moves from the next recessed portion 41c, over the top of the adjoining projected portion 41b, to the further next recessed portion 41c for resilient meshing engagement therewith, in a similar manner to the abovementioned. In this way, each of the air-emitting-direction adjustment operator or grille 32 in the instant embodiment can be rotated to any desired rotational position or orientation step by step, by angle θ per step, and can be reliably held in the desired orientation by the resilient meshing engagement between the leaf spring 53 and the recessed portion 41c of the inner circumferential surface 41a defining the mounting hole 41. This arrangement can reliably prevent an accidental rattle or rotation of the air-emitting-direction adjustment operator or grille 32 due to vibration, shake or the like of the vehicle 10.

Figure 15:
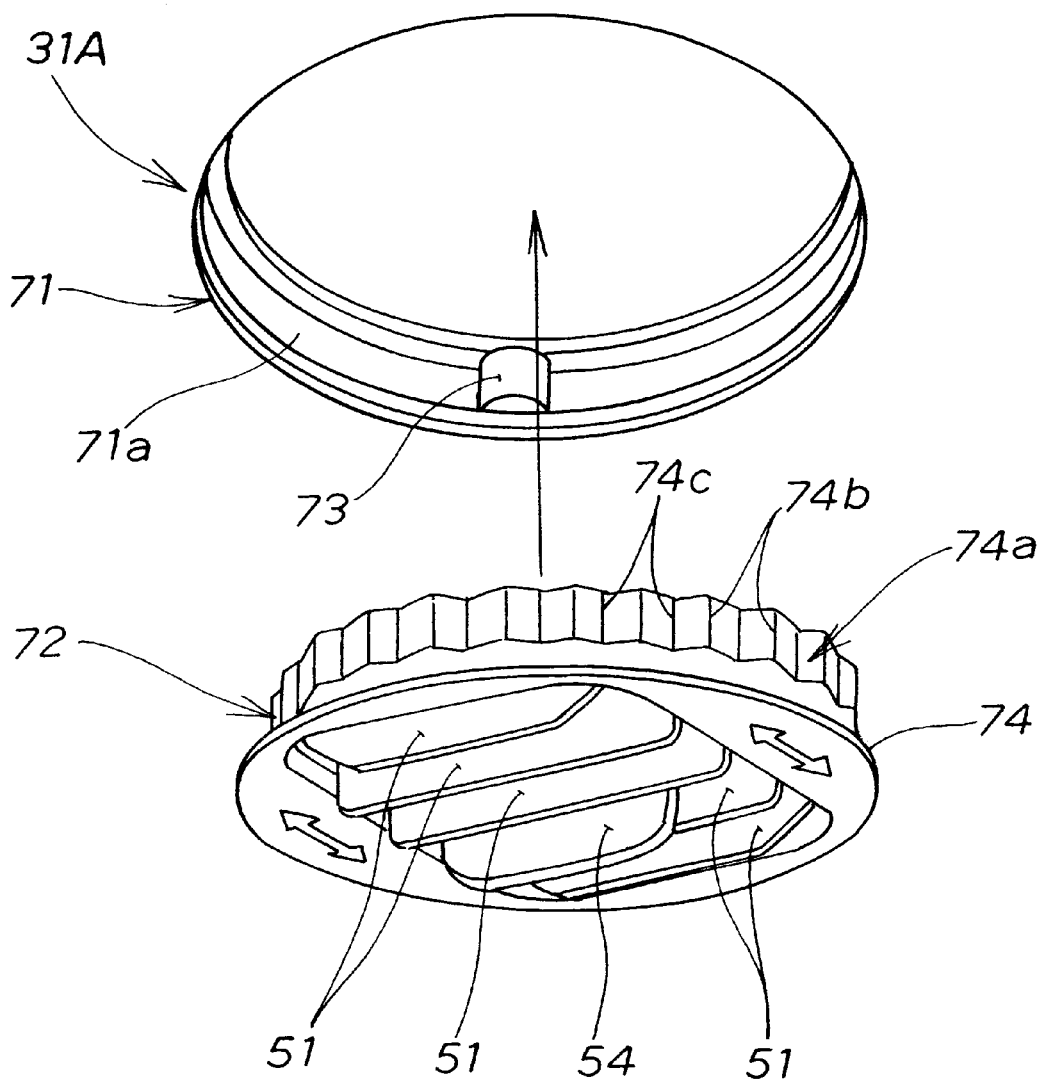
FIG. 15 is an exploded perspective view showing modifications of the air-emitting-direction adjustment operator or grille and the mounting hole for the air-emitting-direction adjustment operator.

FIG. 15 is an exploded perspective view showing modifications of the air-emitting-direction adjustment operator or grille and the hole for mounting the air-emitting-direction adjustment operator 32 in the vehicle air conditioner of the present invention. The modified or second-type direction-adjustment-operator mounting hole 71, corresponding to the hole 41 for the first-type air-emitting-direction adjustment operator 32, is formed in a port base member 31A, and the modified air-emitting-direction adjustment operator or grille 72 is rotatably mounted in the mounting hole 71. Leaf spring 73 is secured to and projects inward from the inner circumferential surface 71a of the port base member 31A defining the mounting hole 71. The air-emitting-direction adjustment operator 72 includes a plurality of parallel fins 51 each pivotably held by a fin holder or grille holder 74. Parallel air slits or elongate air gaps are formed between the fins 51 for volume- and direction-controlled emission or blowoff of the conditioned air from the non-branched air-accumulating chamber. Outer circumferential surface 74a of an upper portion of the fin holder 74 is formed into a substantial sawtooth shape having a series of alternating projected and recessed portions (mountain and valley portions) 74b and 74c for resilient meshing engagement with the leaf spring 73 on the port base member 31A.

Figure 16:
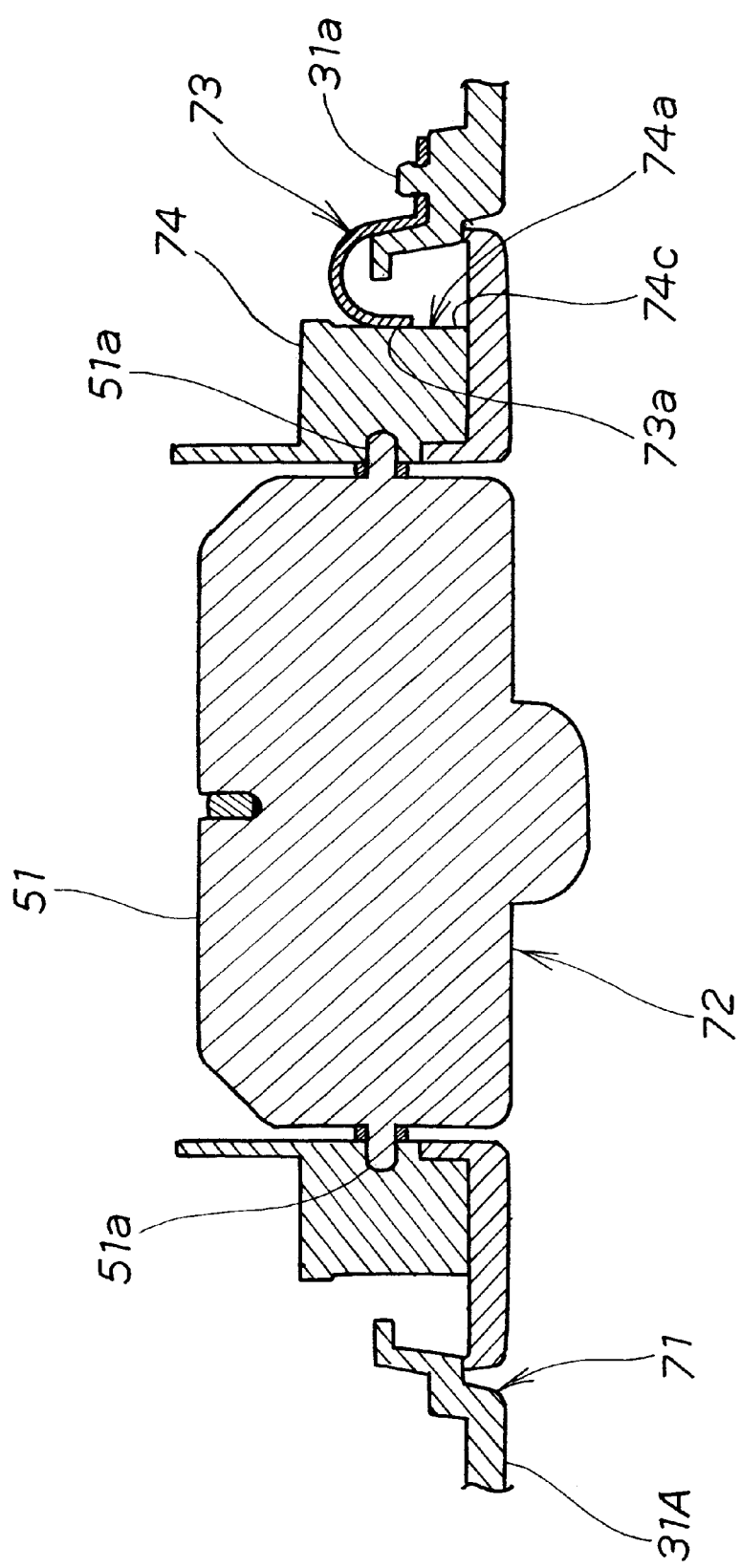
FIG. 16 is a sectional view showing the modified air-emitting-direction adjustment operator and mounting hole of FIG. 15.

FIG. 16 is a sectional view showing the air-emitting-direction adjustment operator 72 of FIG. 15 mounted in the mounting hole 71. As shown, each of the fins 51 has small horizontal projections 51a at its horizontal opposite ends fitting into opposed wall portions of the fin holder 52 for vertical pivotal movement of the fin 51 relative to the fin holder 74, and an upward protrusion 31a is formed on a portion of the upper surface of the port base member 31A near the mounting hole 71. Outer end portion of the leaf spring 73 is fitted in and thus engaged with the upward protrusion 31a while the inner or distal end 73a of the leaf spring 73 is resiliently pressed against one of the recessed portions 74c (i.e., between adjoining projected portions 74b) in the outer circumferential surface 74a of the fin holder 74 for resilient meshing engagement therewith. The modification shown in FIGS. 15 and 16 applies to the rear air emission port section 25 as well, although it has been described as applied to the fore air emission port section 24.

As set forth above in relation to FIGS. 6 and 7 and FIGS. 14A and 14B, each of the first-type air-emitting-direction adjustment operators or grilles 32, having a plurality of parallel air slits or elongate air gaps between the parallel fins 51, is rotatably fitted in the corresponding mounting hole 41 in such a manner that the direction of the conditioned air emitted through the adjustment operator 32 can be adjusted as desired by rotating the adjustment operator 32 either rightward or leftward. This first-type air-emitting-direction adjustment operator 32 proposed by the inventors of the present invention is characterized in that the inner circumferential surface of the port base member 31 or 35 defining the mounting hole 41 is formed into a substantial sawtooth shape having a series of alternating projected and recessed portions and that the leaf spring 53 is resiliently pressed at its distal end 53a against the inner circumferential surface of the port base member so that the adjustment operator 32 can be held at any desired rotational position, i.e. in any desired orientation or air emitting direction, in the associated mounting hole 41.

Further, as set forth above in relation to FIGS. 15 and 16, each of the second-type air-emitting-direction adjustment operators or grilles 72, having a plurality of parallel air slits or elongate air gaps between the parallel fins 51, is rotatably fitted in the corresponding mounting hole 71 in such a manner that the direction of the conditioned air emitted through the adjustment operator 72 can be adjusted as desired by rotating the adjustment operator 72 either rightward or leftward. This second-type air-emitting-direction adjustment operator 72 proposed by the inventors of the present invention is characterized in that the outer circumferential surface 74a of the adjustment operator 72 is formed into a substantial sawtooth shape having a series of alternating projected and recessed portions 74a and 74b and that the leaf spring 73 provided on the port base member is resiliently pressed at its inner or distal end 73a against the outer circumferential surface 74a so that the adjustment operator 72 can be held at any desired rotational position, i.e. in any desired orientation or air emitting direction, in the associated mounting hole 71.

With the above-mentioned inventive arrangement, the air-emitting-direction adjustment operators 32 and 72 of the invention can each be adjusted to and held at any desired rotational position, so that any desired direction of the conditioned air emission can be reliably obtained and such a desired air emitting direction can be retained as desired without being adversely influenced by vibration, shake or the like of the vehicle 10.

The preferred embodiment of the invention has been described above as providing a sawtooth-like surface, having a series of projected and recessed portions, on and along one of the outer circumferential surface of the air-emitting-direction adjustment operator or grille and the inner circumferential surface of the port base member defining the direction-adjustment-operator (or grille) mounting hole. Note that the alternating projected and recessed portions may be formed at either uniform intervals or non-uniform intervals. Further, only projected portions or only recessed portions, rather than the alternating projected and recessed portions, may be provided at predetermined intervals on and along one of the cylindrical surfaces of the air-emitting-direction adjustment operator and the port base member defining the mounting hole; in this case too, the projected portions or recessed portions may be formed at either uniform intervals or non-uniform intervals. Further, the leaf spring engaging with the sawtooth-like surface may be any other kind of locking protrusion, such as a rod movable, by an appropriate resilient means, radially from the outer circumferential surface of the grille or from the inner circumferential surface of the port base member defining the grille mounting hole, or a roller rotatably mounted, via an appropriate resilient means, on the outer circumferential surface of the grille or the inner circumferential surface of the port base member.

Figure 12:
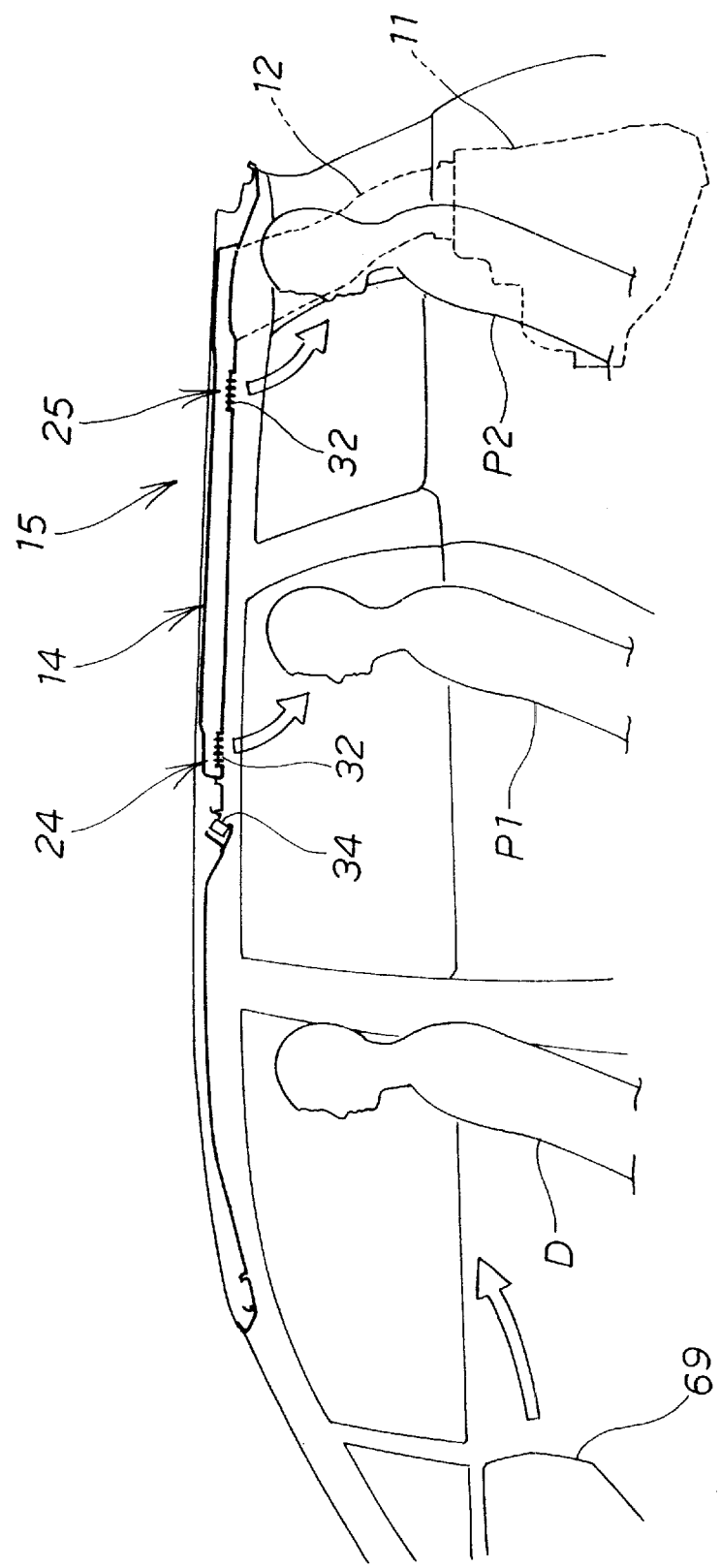
FIG. 12 is a schematic view explanatory of an exemplary manner in which the vehicle air conditioner of the present invention delivers conditioned air, through the roof air duct and air emission ports, into a passenger compartment.

Further, as set forth above primarily in relation to FIGS. 4, 5 and 12, the present invention is also characterized in that the air-emitting-direction adjustment operators or grilles 32, direction-adjustment-operator (grille) mounting holes 41, air-conditioner operating section 34 and room lamps 33 are provided together as a unit on the fore rectangular port base member 31, functioning as the multi-purpose ceiling-component mounting panel, of the fore air emission port section 24 mounted substantially centrally on the roof lining or ceiling base member 21.

With the named ceiling components 32, 41, 34 and 33 rovided together as a unit on the port base member 31, these ceiling components 32, 41, 34 and 33 can be located near the second-row and third-row seats so that every one of the passengers on these rear seats can easily reach and manipulate any desired one of the ceiling components 32, 41, 34 and 33. Thus, the present invention can enhance the convenience of use or operability of the air-emitting-direction adjustment operators 32, direction-adjustment-operator mounting holes 41, air-conditioner operating section 34 and room lamp 33. Further, the collective provision of the ceiling components 32, 41, 34 and 33 at the substantial central portion of the roof lining 21 eliminates the need for a human operator to move a great amount in mounting the ceiling components 32, 41, 34 and 33, thereby greatly enhancing the assembly or mounting efficiency.

Furthermore, with the arrangement that the air-emitting-direction adjustment operators 32, mounting holes 41, air-conditioner operating section 34 and room lamps 33 are provided together as a unit on the port base member 31, the number of necessary parts can be significantly reduced, as compared to the case where the air-emitting-direction adjustment operators 32, air-conditioner operating section 34 and room lamps 33 are mounted separately, and thus the number of the opening 45 for mounting therein the fore air emission port section 24 and attaching the port base member 31 can also be reduced. As a result, the ceiling structure for the vehicle air conditioner can be manufactured at low costs.

Similarly, the air-emitting-direction adjustment operators or grilles 32 and direction-adjustment-operator (grille) mounting holes 41 are provided together as a unit on he rear rectangular port base member 35, functioning as the multi-purpose ceiling-component mounting panel, of the rear air emission port section 25 mounted substantially centrally on the roof lining or ceiling base member 21. The collective provision of the ceiling components 32 and 41 substantially centrally in the widthwise direction of the vehicle eliminates the need for the human operator to move a great amount in mounting the ceiling components 32, thereby greatly enhancing the mounting efficiency.

Furthermore, with the arrangement that the air-emitting-direction adjustment operators 32 attached together as a unit on the rear port base member 35, the number of necessary component parts can be significantly reduced, as compared to the case where the air-emitting-direction adjustment operators 32 are mounted separately. As a result, the vehicle ceiling 15 structure can be manufactured at low costs.

Further, the ceiling components together attached to the multi-purpose ceiling-component mounting panel may include a spot light lamp, operation section for manipulating a speaker, television receiver and audio equipment and operation section for manipulating a sunroof, in addition to the above-mentioned air emission port section, air-conditioner operating section and room lamp. Whereas the ceiling structure has been described above as providing the air emission port section, air-conditioner operating section and room lamp together as a unit on the multi-purpose ceiling-component mounting panel, these air emission port section, air-conditioner operating section and room lamp may be mounted directly on a central portion (such as the above-mentioned depressed portion 21a) of the roof lining.

Obviously, various minor changes and modifications of the present invention are possible in the light of the above teaching. It is therefore to be understood that within the scope of the appended claims the invention may be practiced otherwise than as specifically described.

What is claimed is:

1. A vehicle air conditioner comprising:
   an air duct provided on a ceiling of a vehicle and having an air inlet portion for introducing air into said air duct;
   a plurality of air emission port sections provided on a underside of said air duct for emitting the air from said air duct toward respective rear seats of the vehicle;
   an air-accumulating chamber disposed in said air duct communicating with said air inlet portion and said air emission port sections so that the air introduced via the air inlet portion is temporarily accumulated in the air-accumulating chamber before it is emitted through said air emission port sections, said air-accumulating chamber having a non-branched configuration and located substantially centrally in a widthwise direction of the vehicle, said air-accumulating chamber extending in a longitudinal direction of the vehicle from a rear end portion to a near-center portion of the ceiling; and
   a single air distribution member for distributing the air to be delivered from said air inlet portion, through said air-accumulating chamber, to said air emission port sections, wherein the air distribution member has a plate shape and is disposed in the air-accumulating chamber adjacent to the air inlet portion so as to distribute the air such that the air is accumulated in the air accumulating chamber to assume a substantially uniform pressure distribution and can be emitted through the air emission port section in generally uniform volumes.

2. A vehicle air conditioner as claimed in claim 1 where said air-accumulating chamber having the non-branched configuration is generally in a rectangular shape as viewed in plan.

3. A vehicle air conditioner comprising:
   a grille having a plurality of parallel air slits and rotatably mounted in an air emission port formed in a port base member in such a manner that a direction of air emitted through the air slits of said grille can be adjusted by rotating said grille either rightward or leftward in the air emission port;
   a sawtooth-like surface formed of alternating ridges and grooves, on and along one of an outer circumferential surface of said grille and an inner circumferential surface of the port base member defining the air emission port; and
   a locking protrusion provided, on other of the outer circumferential surface of said grille and the inner circumferential surface of the port base member, for meshing engagement with said sawtooth-like surface, wherein the locking protrusion is formed from a resilient material and is resiliently deformable so that said grille can be rotated over a desired angle to a desired rotational position against the resiliency of the locking protrusion and held at the desired rotational position in said air emission port by the resiliency of the locking protrusion.

4. A vehicle air conditioner and ceiling structure for an air-conditioned vehicle comprising:

a ceiling base member;

a port base member mounted substantially centrally on said ceiling base member and having formed therein a plurality of air emission ports for a vehicle air conditioner;

an air duct provided on a ceiling of a vehicle and having an air inlet portion for introducing air into said air duct and an air-accumulating chamber communicating with said air inlet portion, said air-accumulating chamber having a non-branched configuration and located substantially centrally in a widthwise direction of the vehicle, said air-accumulating chamber extending in a longitudinal direction of the vehicle from a rear end portion to a near-center portion of the ceiling, wherein air emission port sections provided on a underside of said air duct and communicating with said air-accumulating chamber for emitting the air from said air-accumulating chamber toward respective rear seats of the vehicle; and an air distribution member for distributing the air to be delivered from said air inlet portion, through said air-accumulating chamber, to said air emission port sections, wherein the air distribution member is incorporated into the ceiling air duct so that air is distributed variably from the air inlet portion through the air accumulating chamber to the air emission ports;

an air-conditioner operating section for adjusting temperature and/or volume of the air emitted through said air emission ports; and a room lamp for illuminating a passenger compartment, said air emission ports, said air-conditioner operating section and said room lamp being provided together as a unit on said port base member.

5. A vehicle air conditioner and ceiling structure according to claim 4, further comprising a plurality of grilles, mounted in respective ones of said air emission ports, for fixing a flow direction of air emitted from said ports.

* * * * *